(12) United States Patent
Conrad et al.

(10) Patent No.: US 9,788,032 B2
(45) Date of Patent: *Oct. 10, 2017

(54) DETERMINING A FUTURE PORTION OF A CURRENTLY PRESENTED MEDIA PROGRAM

(71) Applicant: Microsoft Technology Licensing, LLC, Redmond, WA (US)

(72) Inventors: Michael J. Conrad, Monroe, WA (US); Geoffrey J. Hulten, Lynnwood, WA (US); Kyle J. Krum, Sammamish, WA (US); Umaimah A. Mendhro, San Francisco, CA (US); Darren B. Remington, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,074

(22) Filed: Jan. 13, 2015

(65) Prior Publication Data

US 2015/0128161 A1 May 7, 2015

Related U.S. Application Data

(63) Continuation of application No. 13/482,867, filed on May 29, 2012, now Pat. No. 8,959,541.

(30) Foreign Application Priority Data

May 4, 2012 (CA) ..................................... 2775700

(51) Int. Cl.
*H04N 21/25* (2011.01)
*H04N 21/2668* (2011.01)
(Continued)

(52) U.S. Cl.
CPC ........... *H04N 21/252* (2013.01); *G06Q 90/00* (2013.01); *H04N 21/2668* (2013.01);
(Continued)

(58) Field of Classification Search
CPC ..................... H04N 21/252; H04N 21/4421
See application file for complete search history.

(56) References Cited

U.S. PATENT DOCUMENTS 4,288,078 A 9/1981 Lugo
4,627,620 A 12/1986 Yang
(Continued)

FOREIGN PATENT DOCUMENTS

CA 2775700 7/2012
CA 2775814 9/2013
(Continued)

OTHER PUBLICATIONS

"Final Office Action", U.S. Appl. No. 13/039,024, dated Sep. 24, 2015, 20 pages.
(Continued)

*Primary Examiner* — Nathan Flynn
*Assistant Examiner* — Alexander Q Huerta

(57) ABSTRACT

This document describes techniques and apparatuses for determining a future portion of a currently presented media program. The techniques and apparatuses can receive current media reactions of one or many people to a currently presented media program and determine later portions to present in the media program based on the media reactions. In some embodiments, for example, a program can be presented live, reactions can be received during the live presentation, and the program altered on-the-fly and in real time based on those reactions. Further, the alterations can be general or tailored to a group or a particular person.

20 Claims, 16 Drawing Sheets

(51) Int. Cl.
  *H04N 21/422* (2011.01)
  *H04N 21/458* (2011.01)
  *H04N 21/466* (2011.01)
  *H04N 21/658* (2011.01)
  *H04N 21/81* (2011.01)
  *G06Q 90/00* (2006.01)
  *H04N 21/442* (2011.01)

(52) U.S. Cl.
  CPC . *H04N 21/42201* (2013.01); *H04N 21/44213* (2013.01); *H04N 21/44218* (2013.01); *H04N 21/458* (2013.01); *H04N 21/4667* (2013.01); *H04N 21/6582* (2013.01); *H04N 21/812* (2013.01)

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 4,931,865 A | 6/1990 | Scarampi |
| 5,101,444 A | 3/1992 | Wilson et al. |
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,668,997 A | 9/1997 | Lynch-Freshner et al. |
| 5,682,196 A | 10/1997 | Freeman |
| 5,682,229 A | 10/1997 | Wangler |
| 5,690,582 A | 11/1997 | Ulrich et al. |
| 5,694,162 A * | 12/1997 | Freeny, Jr. ......... H04N 7/17354 348/E7.075 |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,805,167 A | 9/1998 | van Cruyningen |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 5/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 5,999,766 A | 12/1999 | Hisatomi et al. |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama et al. |
| 6,115,482 A | 9/2000 | Sears |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 | 1/2001 | Liu |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 | 9/2001 | Liu |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,353,764 B1 | 3/2002 | Imagawa et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 | 2/2003 | Liu |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,622,119 B1 | 9/2003 | Ramaswamy et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |

(56) References Cited

U.S. PATENT DOCUMENTS

| | | | |
|---|---|---|---|
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Selley et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,881,526 B2 | 4/2005 | Bobeck et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 | 10/2006 | Dryer et al. |
| 7,121,946 B2 | 10/2006 | Paul et al. |
| 7,134,130 B1 | 11/2006 | Thomas |
| 7,145,330 B2 | 12/2006 | Xiao |
| 7,146,627 B1 * | 12/2006 | Ismail ................... H04H 60/06 348/E7.061 |
| 7,151,530 B2 | 12/2006 | Roeber et al. |
| 7,155,305 B2 | 12/2006 | Hayes et al. |
| 7,162,082 B2 | 1/2007 | Edwards |
| 7,170,492 B2 | 1/2007 | Bell |
| 7,170,605 B2 | 1/2007 | Cromwell et al. |
| 7,184,048 B2 | 2/2007 | Hunter |
| 7,202,898 B1 | 4/2007 | Braun et al. |
| 7,212,665 B2 | 5/2007 | Yang et al |
| 7,214,932 B2 | 5/2007 | Brunfeld et al. |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |
| 7,231,235 B2 | 6/2007 | Harrold |
| 7,246,329 B1 | 7/2007 | Miura et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,435,941 B2 | 10/2008 | Ayres |
| 7,436,496 B2 | 10/2008 | Kawahito |
| 7,447,635 B1 | 11/2008 | Konopka et al. |
| 7,450,736 B2 | 11/2008 | Yang et al. |
| 7,452,275 B2 | 11/2008 | Kuraishi |
| 7,460,690 B2 | 12/2008 | Cohen et al. |
| 7,487,375 B2 | 2/2009 | Lourie et al. |
| 7,489,812 B2 | 2/2009 | Fox et al. |
| 7,512,889 B2 | 3/2009 | Newell et al. |
| 7,536,032 B2 | 5/2009 | Bell |
| 7,538,782 B2 | 5/2009 | Kuroki et al. |
| 7,555,142 B2 | 6/2009 | Hildreth et al. |
| 7,559,841 B2 | 7/2009 | Hashimoto |
| 7,560,701 B2 | 7/2009 | Oggier et al. |
| 7,568,116 B2 | 7/2009 | Dooley et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,636,456 B2 | 12/2009 | Collins et al. |
| 7,640,304 B1 | 12/2009 | Goldscheider |
| 7,643,056 B2 | 1/2010 | Silsby |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,140 B2 | 6/2010 | Vinson et al. |
| 7,746,345 B2 | 6/2010 | Hunter |
| 7,752,633 B1 | 7/2010 | Fleming |
| 7,760,182 B2 | 7/2010 | Ahmad et al. |
| 7,762,665 B2 | 7/2010 | Vertegaal et al. |
| 7,764,311 B2 | 7/2010 | Bill |
| 7,770,136 B2 | 8/2010 | Beeck et al. |
| 7,809,167 B2 | 10/2010 | Bell |
| 7,814,518 B2 | 10/2010 | Ducheneaut et al. |
| 7,834,846 B1 | 11/2010 | Bell |
| 7,836,480 B1 | 11/2010 | Harvey et al. |
| 7,852,262 B2 | 12/2010 | Namineni et al. |
| 7,889,073 B2 | 2/2011 | Zalewski |
| 7,895,076 B2 | 2/2011 | Kutaragi et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,081,302 B2 | 12/2011 | Paluszek et al. |
| 8,096,660 B2 | 1/2012 | Vertegaal et al. |
| 8,102,422 B1 | 1/2012 | Kenderov et al. |
| 8,132,187 B2 | 3/2012 | Klyuchevskyy |
| 8,141,775 B1 | 3/2012 | Aidasani et al. |
| 8,189,053 B2 | 5/2012 | Pryor |
| 8,196,168 B1 | 6/2012 | Bryan et al. |
| 8,260,740 B2 | 9/2012 | Davis et al. |
| 8,322,856 B2 | 12/2012 | Vertegaal et al. |
| 8,327,395 B2 | 12/2012 | Lee et al. |
| 8,332,883 B2 | 12/2012 | Lee et al. |
| 8,418,085 B2 | 4/2013 | Snook et al. |
| 8,471,868 B1 | 6/2013 | Wilson et al. |
| 8,499,245 B1 | 7/2013 | Froment et al. |
| 8,522,289 B2 | 8/2013 | Athsani et al. |
| 8,620,113 B2 | 12/2013 | Yee |
| 8,635,637 B2 | 1/2014 | Krum |
| 8,660,303 B2 | 2/2014 | Izadi et al. |
| 8,760,395 B2 | 6/2014 | Kim et al. |
| 8,817,061 B2 | 8/2014 | Shaffer et al. |
| 8,898,687 B2 * | 11/2014 | Hulten ................. H04N 21/442 725/12 |
| 8,943,526 B2 | 1/2015 | Rivera et al. |
| 8,959,541 B2 | 2/2015 | Conrad et al. |
| 9,088,823 B1 | 7/2015 | Price |
| 9,100,685 B2 | 8/2015 | Conrad et al. |
| 9,154,837 B2 | 10/2015 | Krum et al. |
| 9,372,544 B2 | 6/2016 | Kim et al. |
| 9,628,844 B2 | 4/2017 | Conrad et al. |
| 2001/0021994 A1 | 9/2001 | Nash |
| 2002/0041327 A1 | 4/2002 | Hildreth et al. |

(56) References Cited

U.S. PATENT DOCUMENTS

| | | |
|---|---|---|
| 2002/0072952 A1 | 6/2002 | Hamzy et al. |
| 2002/0073417 A1 | 6/2002 | Kondo et al. |
| 2002/0089526 A1 | 7/2002 | Buxton et al. |
| 2002/0108000 A1 | 8/2002 | Iori et al. |
| 2002/0120925 A1 | 8/2002 | Logan |
| 2002/0144259 A1 | 10/2002 | Gutta et al. |
| 2002/0157095 A1 | 10/2002 | Masumitsu et al. |
| 2002/0174230 A1 | 11/2002 | Gudorf et al. |
| 2002/0174445 A1 | 11/2002 | Miller et al. |
| 2002/0178446 A1 | 11/2002 | Sie et al. |
| 2002/0184098 A1 | 12/2002 | Giraud et al. |
| 2003/0001846 A1 | 1/2003 | Davis et al. |
| 2003/0005439 A1 | 1/2003 | Rovira |
| 2003/0007018 A1 | 1/2003 | Seni et al. |
| 2003/0007649 A1 | 1/2003 | Riggs |
| 2003/0033600 A1 | 2/2003 | Cliff et al. |
| 2003/0066071 A1 | 4/2003 | Gutta et al. |
| 2003/0074661 A1 | 4/2003 | Krapf et al. |
| 2003/0081834 A1 | 5/2003 | Philomin et al. |
| 2003/0085929 A1 | 5/2003 | Huber et al. |
| 2003/0093784 A1* | 5/2003 | Dimitrova ............... H04N 7/163 725/10 |
| 2003/0112467 A1 | 6/2003 | McCollum et al. |
| 2003/0118974 A1 | 6/2003 | Obrador |
| 2003/0126593 A1 | 7/2003 | Mault |
| 2003/0141360 A1 | 7/2003 | De Leo et al. |
| 2003/0167358 A1 | 9/2003 | Marvin et al. |
| 2003/0185358 A1 | 10/2003 | Sakamoto |
| 2004/0001616 A1 | 1/2004 | Gutta et al. |
| 2004/0006477 A1 | 1/2004 | Craner |
| 2004/0046736 A1 | 3/2004 | Pryor et al. |
| 2004/0056907 A1 | 3/2004 | Sharma et al. |
| 2004/0068409 A1 | 4/2004 | Tanaka et al. |
| 2004/0070573 A1 | 4/2004 | Graham |
| 2004/0113933 A1 | 6/2004 | Guler |
| 2004/0155962 A1 | 8/2004 | Marks |
| 2004/0168190 A1 | 8/2004 | Saari et al. |
| 2004/0189720 A1 | 9/2004 | Wilson et al. |
| 2004/0193413 A1 | 9/2004 | Wilson et al. |
| 2004/0196309 A1 | 10/2004 | Hawkins |
| 2004/0207597 A1 | 10/2004 | Marks |
| 2004/0233238 A1 | 11/2004 | Lahdesmaki |
| 2005/0010637 A1 | 1/2005 | Dempski et al. |
| 2005/0022239 A1 | 1/2005 | Meuleman |
| 2005/0059488 A1 | 3/2005 | Larsen et al. |
| 2005/0076365 A1 | 4/2005 | Popov et al. |
| 2005/0082480 A1 | 4/2005 | Wagner et al. |
| 2005/0096753 A1 | 5/2005 | Arling et al. |
| 2005/0120372 A1* | 6/2005 | Itakura ............... H04N 7/17318 725/46 |
| 2005/0189415 A1 | 9/2005 | Fano et al. |
| 2005/0190973 A1 | 9/2005 | Kristensson et al. |
| 2005/0212755 A1 | 9/2005 | Marvit |
| 2005/0212767 A1 | 9/2005 | Marvit et al. |
| 2005/0212911 A1 | 9/2005 | Marvit |
| 2005/0215319 A1 | 9/2005 | Rigopulos et al. |
| 2005/0223237 A1 | 10/2005 | Barletta et al. |
| 2005/0229116 A1 | 10/2005 | Endler et al. |
| 2005/0229199 A1 | 10/2005 | Yabe |
| 2005/0234998 A1 | 10/2005 | Lesandrini et al. |
| 2005/0257166 A1 | 11/2005 | Tu |
| 2005/0267869 A1 | 12/2005 | Horvitz et al. |
| 2005/0271279 A1 | 12/2005 | Fujimura et al. |
| 2005/0289582 A1 | 12/2005 | Tavares et al. |
| 2006/0020904 A1 | 1/2006 | Aaltonen |
| 2006/0026168 A1 | 2/2006 | Bosworth et al. |
| 2006/0031776 A1 | 2/2006 | Glein et al. |
| 2006/0031786 A1 | 2/2006 | Hillis et al. |
| 2006/0055685 A1 | 3/2006 | Rimas-Ribikauskas et al. |
| 2006/0064486 A1 | 3/2006 | Baron et al. |
| 2006/0073816 A1 | 4/2006 | Kim et al. |
| 2006/0101349 A1 | 5/2006 | Lieberman et al. |
| 2006/0123360 A1 | 6/2006 | Anwar et al. |
| 2006/0158307 A1 | 7/2006 | Lee et al. |
| 2006/0174313 A1 | 8/2006 | Ducheneaut et al. |
| 2006/0184800 A1 | 8/2006 | Rosenberg |
| 2006/0188144 A1 | 8/2006 | Sasaki et al. |
| 2006/0188234 A1 | 8/2006 | Takeshita |
| 2006/0200780 A1 | 9/2006 | Iwema et al. |
| 2006/0210958 A1 | 9/2006 | Rimas-Ribikauskas |
| 2006/0218573 A1 | 9/2006 | Proebstel |
| 2006/0221081 A1 | 10/2006 | Cohen et al. |
| 2006/0239558 A1 | 10/2006 | Rafii et al. |
| 2006/0253793 A1 | 11/2006 | Zhai et al. |
| 2006/0262116 A1 | 11/2006 | Moshiri et al. |
| 2006/0271207 A1 | 11/2006 | Shaw |
| 2006/0280055 A1 | 12/2006 | Miller et al. |
| 2006/0282856 A1 | 12/2006 | Errico et al. |
| 2006/0282859 A1 | 12/2006 | Garbow et al. |
| 2007/0013718 A1 | 1/2007 | Ohba |
| 2007/0018973 A1 | 1/2007 | Shih et al. |
| 2007/0033607 A1 | 2/2007 | Bryan |
| 2007/0060336 A1 | 3/2007 | Marks et al. |
| 2007/0075978 A1 | 4/2007 | Chung |
| 2007/0098222 A1 | 5/2007 | Porter et al. |
| 2007/0098254 A1 | 5/2007 | Yang et al. |
| 2007/0140532 A1 | 6/2007 | Goffin |
| 2007/0143715 A1 | 6/2007 | Hollins et al. |
| 2007/0143787 A1* | 6/2007 | Cankaya ............... H04N 5/76 725/34 |
| 2007/0150281 A1 | 6/2007 | Hoff |
| 2007/0150916 A1 | 6/2007 | Begole et al. |
| 2007/0203685 A1 | 8/2007 | Takano |
| 2007/0214292 A1 | 9/2007 | Hayes et al. |
| 2007/0214471 A1 | 9/2007 | Rosenberg |
| 2007/0216894 A1 | 9/2007 | Garcia et al. |
| 2007/0219430 A1 | 9/2007 | Moore |
| 2007/0260984 A1 | 11/2007 | Marks et al. |
| 2007/0271580 A1 | 11/2007 | Tischer et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0016544 A1 | 1/2008 | Lee et al. |
| 2008/0018591 A1 | 1/2008 | Pittel et al. |
| 2008/0026838 A1 | 1/2008 | Dunstan et al. |
| 2008/0027984 A1 | 1/2008 | Perdomo |
| 2008/0033790 A1 | 2/2008 | Nickerson et al. |
| 2008/0052026 A1 | 2/2008 | Amidon et al. |
| 2008/0059578 A1 | 3/2008 | Albertson et al. |
| 2008/0062257 A1 | 3/2008 | Corson |
| 2008/0065243 A1 | 3/2008 | Fallman et al. |
| 2008/0081694 A1 | 4/2008 | Hong et al. |
| 2008/0091512 A1 | 4/2008 | Marci et al. |
| 2008/0092159 A1 | 4/2008 | Dmitriev et al. |
| 2008/0100620 A1 | 5/2008 | Nagai et al. |
| 2008/0100825 A1 | 5/2008 | Zalewski |
| 2008/0124690 A1 | 5/2008 | Redlich |
| 2008/0126937 A1 | 5/2008 | Pachet |
| 2008/0134102 A1 | 6/2008 | Movold et al. |
| 2008/0151113 A1 | 6/2008 | Park |
| 2008/0152191 A1 | 6/2008 | Fujimura et al. |
| 2008/0152263 A1 | 6/2008 | Harrison |
| 2008/0163130 A1 | 7/2008 | Westerman |
| 2008/0163283 A1 | 7/2008 | Tan et al. |
| 2008/0178126 A1 | 7/2008 | Beeck |
| 2008/0215972 A1 | 9/2008 | Zalewski et al. |
| 2008/0215973 A1 | 9/2008 | Zalewski et al. |
| 2008/0234023 A1 | 9/2008 | Mullahkhel et al. |
| 2008/0266328 A1 | 10/2008 | Fong |
| 2008/0310707 A1 | 12/2008 | Kansal et al. |
| 2008/0320190 A1 | 12/2008 | Lydon et al. |
| 2009/0013366 A1 | 1/2009 | You et al. |
| 2009/0019397 A1 | 1/2009 | Buffet et al. |
| 2009/0025024 A1 | 1/2009 | Beser et al. |
| 2009/0027337 A1 | 1/2009 | Hildreth |
| 2009/0036764 A1 | 2/2009 | Rivas et al. |
| 2009/0037945 A1* | 2/2009 | Greig ............... G09F 27/00 725/10 |
| 2009/0051648 A1 | 2/2009 | Shamaie et al. |
| 2009/0055426 A1 | 2/2009 | Kalasapur et al. |
| 2009/0055854 A1 | 2/2009 | Wright et al. |
| 2009/0061841 A1 | 3/2009 | Chaudhri et al. |
| 2009/0070798 A1 | 3/2009 | Lee et al. |

(56) References Cited

U.S. PATENT DOCUMENTS

| | | |
|---|---|---|
| 2009/0072992 A1 | 3/2009 | Yun |
| 2009/0073136 A1 | 3/2009 | Choi |
| 2009/0085864 A1 | 4/2009 | Kutliroff et al. |
| 2009/0089225 A1 | 4/2009 | Baier et al. |
| 2009/0094627 A1 | 4/2009 | Lee et al. |
| 2009/0094628 A1 | 4/2009 | Lee et al. |
| 2009/0094629 A1 | 4/2009 | Lee et al. |
| 2009/0094630 A1 | 4/2009 | Brown |
| 2009/0106314 A1 | 4/2009 | Song et al. |
| 2009/0106645 A1 | 4/2009 | Knobel |
| 2009/0112817 A1 | 4/2009 | Jung et al. |
| 2009/0116684 A1 | 5/2009 | Andreasson |
| 2009/0133051 A1 | 5/2009 | Hildreth |
| 2009/0141933 A1 | 6/2009 | Wagg |
| 2009/0143141 A1 | 6/2009 | Wells et al. |
| 2009/0146775 A1 | 6/2009 | Bonnaud et al. |
| 2009/0150919 A1 | 6/2009 | Lee et al. |
| 2009/0157472 A1 | 6/2009 | Burazin et al. |
| 2009/0167679 A1 | 7/2009 | Klier et al. |
| 2009/0167882 A1 | 7/2009 | Chen et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0183220 A1 | 7/2009 | Amento |
| 2009/0193099 A1 | 7/2009 | Partridge et al. |
| 2009/0195392 A1 | 8/2009 | Zalewski |
| 2009/0210631 A1 | 8/2009 | Bosworth et al. |
| 2009/0217211 A1 | 8/2009 | Hildreth et al. |
| 2009/0217315 A1 | 8/2009 | Malik et al. |
| 2009/0221368 A1 | 9/2009 | Yen et al. |
| 2009/0228841 A1 | 9/2009 | Hildreth |
| 2009/0234718 A1 | 9/2009 | Green |
| 2009/0235195 A1 | 9/2009 | Shin |
| 2009/0251425 A1 | 10/2009 | Sohn et al. |
| 2009/0252423 A1 | 10/2009 | Zhu et al. |
| 2009/0259960 A1 | 10/2009 | Steinle et al. |
| 2009/0296002 A1 | 12/2009 | Lida et al. |
| 2009/0303231 A1 | 12/2009 | Robinet et al. |
| 2009/0320055 A1 | 12/2009 | Langille et al. |
| 2009/0327977 A1 | 12/2009 | Bachfischer et al. |
| 2010/0005492 A1 | 1/2010 | Takano et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0042932 A1 | 2/2010 | Lehtiniemi et al. |
| 2010/0063880 A1 | 3/2010 | Atsmon et al. |
| 2010/0070913 A1 | 3/2010 | Murrett et al. |
| 2010/0070987 A1* | 3/2010 | Amento .............. H04H 60/33 725/10 |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0095332 A1 | 4/2010 | Gran et al. |
| 2010/0107184 A1 | 4/2010 | Shintani |
| 2010/0122286 A1 | 5/2010 | Begeja et al. |
| 2010/0138780 A1 | 6/2010 | Marano et al. |
| 2010/0138797 A1 | 6/2010 | Thorn |
| 2010/0138798 A1 | 6/2010 | Wilson et al. |
| 2010/0146389 A1 | 6/2010 | Yoo et al. |
| 2010/0151946 A1 | 6/2010 | Wilson et al. |
| 2010/0153856 A1 | 6/2010 | Russ |
| 2010/0153984 A1 | 6/2010 | Neufeld |
| 2010/0162177 A1 | 6/2010 | Eves et al. |
| 2010/0169157 A1 | 7/2010 | Muhonen et al. |
| 2010/0169842 A1 | 7/2010 | Migos |
| 2010/0169905 A1 | 7/2010 | Fukuchi et al. |
| 2010/0191631 A1 | 7/2010 | Weidmann |
| 2010/0207874 A1 | 8/2010 | Yuxin et al. |
| 2010/0207875 A1 | 8/2010 | Yeh |
| 2010/0211439 A1* | 8/2010 | Marci .................. H04N 21/84 705/7.29 |
| 2010/0235667 A1 | 9/2010 | Mucignat et al. |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0271802 A1 | 10/2010 | Recker et al. |
| 2010/0278393 A1 | 11/2010 | Snook et al. |
| 2010/0286983 A1 | 11/2010 | Cho |
| 2010/0295782 A1 | 11/2010 | Binder |
| 2010/0295783 A1 | 11/2010 | El Dokor et al. |
| 2010/0306712 A1 | 12/2010 | Snook et al. |
| 2010/0327766 A1 | 12/2010 | Recker et al. |
| 2010/0332842 A1 | 12/2010 | Kalaboukis et al. |
| 2010/0333137 A1 | 12/2010 | Hamano et al. |
| 2011/0007142 A1 | 1/2011 | Perez et al. |
| 2011/0016102 A1 | 1/2011 | Hawthorne et al. |
| 2011/0026765 A1 | 2/2011 | Ivanich |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0084983 A1 | 4/2011 | Demaine |
| 2011/0085705 A1 | 4/2011 | Izadi et al. |
| 2011/0115887 A1 | 5/2011 | Yoo et al. |
| 2011/0126154 A1 | 5/2011 | Boehler et al. |
| 2011/0145040 A1 | 6/2011 | Zahn et al. |
| 2011/0145041 A1 | 6/2011 | Salamatov et al. |
| 2011/0157009 A1 | 6/2011 | Kim et al. |
| 2011/0161912 A1 | 6/2011 | Eteminan et al. |
| 2011/0164143 A1 | 7/2011 | Shintani et al. |
| 2011/0173589 A1 | 7/2011 | Guttman et al. |
| 2011/0208582 A1 | 8/2011 | Hoyle |
| 2011/0214141 A1 | 9/2011 | Oyaizu |
| 2011/0216059 A1 | 9/2011 | Espiritu et al. |
| 2011/0242305 A1 | 10/2011 | Peterson et al. |
| 2011/0246572 A1 | 10/2011 | Kollenkark et al. |
| 2011/0254859 A1 | 10/2011 | Matsuda |
| 2011/0263946 A1 | 10/2011 | el Kaliouby et al. |
| 2011/0264531 A1 | 10/2011 | Bhatia et al. |
| 2011/0282745 A1* | 11/2011 | Meoded ............. G06Q 30/0264 705/14.61 |
| 2011/0310041 A1 | 12/2011 | Williams et al. |
| 2011/0316845 A1 | 12/2011 | Roberts et al. |
| 2011/0320741 A1 | 12/2011 | Tian et al. |
| 2011/0320984 A1 | 12/2011 | Irani et al. |
| 2011/0321096 A1 | 12/2011 | Landow et al. |
| 2012/0005632 A1 | 1/2012 | Broyles, III et al. |
| 2012/0011528 A1 | 1/2012 | Nielsen et al. |
| 2012/0011530 A1 | 1/2012 | Bentolila et al. |
| 2012/0030637 A1 | 2/2012 | Dey et al. |
| 2012/0047525 A1 | 2/2012 | Campagna et al. |
| 2012/0051719 A1 | 3/2012 | Marvit |
| 2012/0060176 A1 | 3/2012 | Chai et al. |
| 2012/0079521 A1 | 3/2012 | Garg et al. |
| 2012/0084812 A1 | 4/2012 | Thompson et al. |
| 2012/0105257 A1 | 5/2012 | Murillo et al. |
| 2012/0105473 A1 | 5/2012 | Bar-Zeev et al. |
| 2012/0109726 A1 | 5/2012 | Ruffini |
| 2012/0117015 A1 | 5/2012 | Sathish |
| 2012/0124456 A1 | 5/2012 | Perez et al. |
| 2012/0124523 A1 | 5/2012 | Zhang et al. |
| 2012/0124603 A1 | 5/2012 | Amada |
| 2012/0174039 A1 | 7/2012 | Rhoads et al. |
| 2012/0192233 A1 | 7/2012 | Wong |
| 2012/0209715 A1 | 8/2012 | Lotan et al. |
| 2012/0226981 A1 | 9/2012 | Clavin |
| 2012/0249741 A1 | 10/2012 | Maciocci et al. |
| 2012/0268362 A1 | 10/2012 | Yee |
| 2012/0280897 A1 | 11/2012 | Balan et al. |
| 2012/0290508 A1 | 11/2012 | Bist |
| 2012/0304059 A1 | 11/2012 | McCloskey |
| 2012/0304206 A1 | 11/2012 | Roberts et al. |
| 2012/0306734 A1 | 12/2012 | Kim et al. |
| 2012/0324491 A1 | 12/2012 | Bathiche et al. |
| 2013/0007671 A1 | 1/2013 | Hammontree et al. |
| 2013/0014144 A1 | 1/2013 | Bhatia et al. |
| 2013/0016103 A1 | 1/2013 | Gossweiler, III et al. |
| 2013/0054652 A1 | 2/2013 | Antonelli et al. |
| 2013/0055087 A1 | 2/2013 | Flint |
| 2013/0106894 A1 | 5/2013 | Davis et al. |

(56) References Cited

U.S. PATENT DOCUMENTS

| | | | |
|---|---|---|---|
| 2013/0117771 A1* | 5/2013 | Lee | G06Q 30/02 725/10 |
| 2013/0136358 A1 | 5/2013 | Dedhia et al. | |
| 2013/0145384 A1* | 6/2013 | Krum | H04N 21/44218 725/10 |
| 2013/0145385 A1* | 6/2013 | Aghajanyan | G06Q 30/02 725/10 |
| 2013/0152113 A1 | 6/2013 | Conrad | |
| 2013/0159555 A1 | 6/2013 | Rosser | |
| 2013/0198690 A1 | 8/2013 | Barsoum et al. | |
| 2013/0226464 A1 | 8/2013 | Marci et al. | |
| 2013/0232515 A1 | 9/2013 | Rivera et al. | |
| 2013/0268954 A1 | 10/2013 | Hulten | |
| 2013/0268955 A1 | 10/2013 | Conrad | |
| 2013/0283162 A1* | 10/2013 | Aronsson | G11B 27/105 715/719 |
| 2013/0298146 A1 | 11/2013 | Conrad | |
| 2013/0298158 A1* | 11/2013 | Conrad | G06Q 30/02 725/34 |
| 2013/0332962 A1 | 12/2013 | Moritz et al. | |
| 2014/0109121 A1 | 4/2014 | Krum et al. | |
| 2014/0196069 A1 | 7/2014 | Ahmed et al. | |
| 2014/0247212 A1 | 9/2014 | Kim | |
| 2015/0062120 A1 | 3/2015 | Reisner-Kollmann et al. | |
| 2015/0262412 A1 | 9/2015 | Gruber et al. | |
| 2015/0296239 A1* | 10/2015 | Burger | H04H 60/33 725/12 |
| 2015/0302645 A1 | 10/2015 | Takeuchi | |
| 2015/0341692 A1* | 11/2015 | Conrad | H04N 21/42201 725/12 |
| 2015/0350730 A1* | 12/2015 | el Kaliouby | A61B 5/165 725/12 |
| 2015/0356774 A1 | 12/2015 | Gal et al. | |
| 2016/0370867 A1 | 12/2016 | Kim et al. | |
| 2017/0188079 A1 | 6/2017 | Conrad et al. | |

FOREIGN PATENT DOCUMENTS

| | | |
|---|---|---|
| CN | 1223391 | 7/1999 |
| CN | 1395798 | 2/2003 |
| CN | 1123223 | 10/2003 |
| CN | 1478239 | 2/2004 |
| CN | 1586078 | 2/2005 |
| CN | 1942970 | 4/2007 |
| CN | 101095055 | 12/2007 |
| CN | 101169955 | 4/2008 |
| CN | 101202994 | 6/2008 |
| CN | 101237915 | 8/2008 |
| CN | 101254344 | 6/2010 |
| CN | 101720551 | 6/2010 |
| CN | 101739562 | 6/2010 |
| CN | 101777250 | 7/2010 |
| CN | 101833286 | 9/2010 |
| CN | 101894502 | 11/2010 |
| CN | 101999108 | 3/2011 |
| CN | 102160437 | 8/2011 |
| CN | 101401422 | 9/2011 |
| CN | 102257761 | 11/2011 |
| CN | 102713788 | 10/2012 |
| EP | 0583061 | 2/1994 |
| EP | 0919906 | 11/1998 |
| EP | 1315375 | 5/2003 |
| GB | 2423808 | 6/2006 |
| GB | 2459707 | 11/2009 |
| JP | 08044490 | 2/1996 |
| JP | 2000050233 | 2/2000 |
| JP | 2002262258 | 9/2002 |
| JP | 2002281447 | 9/2002 |
| JP | 2004110453 | 4/2004 |
| JP | 2004526374 | 8/2004 |
| JP | 2005051653 | 2/2005 |
| JP | 2005218025 | 8/2005 |
| JP | 2006060626 | 3/2006 |
| JP | 2009186630 | 8/2009 |
| JP | 2009205247 | 9/2009 |
| JP | 2009302751 | 12/2009 |
| JP | 2009543497 | 12/2009 |
| JP | 201086356 | 4/2010 |
| JP | 2010113313 | 5/2010 |
| RU | 2138923 | 9/1999 |
| RU | 2417113 | 4/2011 |
| TW | 201210663 | 3/2012 |
| WO | WO-9310708 | 6/1993 |
| WO | WO-9717598 | 5/1997 |
| WO | WO-9915863 | 4/1999 |
| WO | WO-9944698 | 9/1999 |
| WO | WO-0159975 | 8/2001 |
| WO | WO-0163916 | 8/2001 |
| WO | WO-0169799 | 9/2001 |
| WO | WO-02082249 | 10/2002 |
| WO | WO-03001722 | 1/2003 |
| WO | WO-03015056 | 2/2003 |
| WO | WO-03046706 | 6/2003 |
| WO | WO-03054683 | 7/2003 |
| WO | WO-03071410 | 8/2003 |
| WO | WO-03073359 | 9/2003 |
| WO | WO-2007128507 | 11/2007 |
| WO | WO-2008001287 | 1/2008 |
| WO | WO-2009059065 | 5/2009 |
| WO | WO-2011069035 | 6/2011 |

OTHER PUBLICATIONS

"Foreign Office Action", CN Application No. 201310115975.4, dated Jul. 30, 2015, 15 Pages.

"Foreign Office Action", CN Application No. 201310161236.9, dated Sep. 22, 2015, 14 Pages.

"Non-Final Office Action", U.S. Appl. No. 13/114,359, dated Oct. 21, 2015, 10 pages.

"Non-Final Office Action", U.S. Appl. No. 13/114,359, dated Oct. 21, 2015, 14 pages.

"Non-Final Office Action", U.S. Appl. No. 13/411,859, dated Oct. 21, 2015, 16 pages.

"Non-Final Office Action", U.S. Appl. No. 14/280,140, dated Aug. 19, 2015, 8 pages.

"Foreign Notice of Allowance", CA Application No. 2,775,700, dated Jan. 3, 2013, 1 page.

"Virtual High Anxiety", Tech update, Aug. 1995, 1 Page.

"Foreign Office Action", CN Application No. 201110159923.8, dated May 22, 2014, 10 pages.

"Non-Final Office Action", U.S. Appl. No. 12/972,837, dated Jun. 26, 2013, 10 pages.

"International Search Report and Written Opinion", Application No. PCT/US2013/039591, dated Aug. 1, 2014, 10 pages.

"Non-Final Office Action", U.S. Appl. No. 12/474,453, dated Sep. 6, 2011, 10 pages.

"Notice of Allowance", U.S. Appl. No. 12/972,837, dated Oct. 11, 2013, 10 pages.

"Non-Final Office Action", U.S. Appl. No. 13/118,884, dated Dec. 3, 2013, 10 pages.

"Non-Final Office Action", U.S. Appl. No. 13/309,589, dated Dec. 18, 2012, 10 pages.

"International Search Report and Written Opinion", Application No. PCT/US2013/035047, dated Jul. 5, 2013, 10 pages.

"Non-Final Office Action", U.S. Appl. No. 13/488,046, dated Mar. 14, 2014, 11 pages.

"Response to Non-Final Office Action", U.S. Appl. No. 12/794,406, dated Feb. 14, 2013, 12 pages.

"Final Office Action", U.S. Appl. No. 10/396,653, dated Feb. 20, 2009, 12 pages.

"Non-Final Office Action", U.S. Appl. No. 13/441,228, dated Mar. 20, 2013, 12 pages.

"Non-Final Office Action", U.S. Appl. No. 13/039,024, Apr. 7, 2014, 12 pages.

"Final Office Action", U.S. Appl. No. 13/488,046, dated May 1, 2014, 12 pages.

"Designing CEC into your next HDMI Product", Quantum Data White Paper, Retrieved from the Internet<URL:http://www.

(56) References Cited

OTHER PUBLICATIONS quantumdata.com/pdf/CEC_white_paper.pdf> Quantum Data, Inc., Elgin, IL, USA, May 13, 2006, 12 pages.
"Non-Final Office Action", U.S. Appl. No. 13/488,046, dated Jul. 23, 2014, 12 pages.
"Final Office Action", U.S. Appl. No. 13/488,046, dated Dec. 10, 2013, 12 pages.
"Final Office Action", U.S. Appl. No. 13/488,046, dated Jan. 27, 2015, 13 pages.
"Final Office Action", U.S. Appl. No. 13/309,859, dated May 15, 2013, 13 pages.
"Foreign Office Action", CN Application No. 201110159923.8, dated Sep. 2, 2013, 13 pages.
"Non-Final Office Action", U.S. Appl. No. 12/794,406, dated Sep. 6, 2013, 13 pages.
"Non-Final Office Action", U.S. Appl. No. 10/396,653, dated Sep. 8, 2008, 13 pages.
"Non-Final Office Action", U.S. Appl. No. 13/482,867, dated Nov. 5, 2013, 13 pages.
"Non-Final Office Action", U.S. Appl. No. 13/411,859, dated Mar. 11, 2014, 13 pages.
"Final Office Action", U.S. Appl. No. 12/794,406, dated Apr. 22, 2013, 14 pages.
"Final Office Action", U.S. Appl. No. 12/474,453, dated May 10, 2012, 14 pages.
"Final Office Action", U.S. Appl. No. 12/794,406, dated Jun. 4, 2014, 14 pages.
"Final Office Action", U.S. Appl. No. 11/626,794, dated Jun. 11, 2009, 14 pages.
"Non-Final Office Action", U.S. Appl. No. 13/439,284, dated Nov. 8, 2013, 14 pages.
"Final Office Action", U.S. Appl. No. 13/039,024, dated Dec. 3, 2014, 14 pages.
"Final Office Action", U.S. Appl. No. 13/439,284, dated Feb. 10, 2014, 15 pages.
"Final Office Action", U.S. Appl. No. 13/482,867, dated Feb. 21, 2014, 15 pages.
"Final Office Action", U.S. Appl. No. 13/441,228, dated Sep. 11, 2013, 15 pages.
"Non-Final Office Action", U.S. Appl. No. 11/626,794, dated Oct. 27, 2009, 15 pages.
"Non-Final Office Action", U.S. Appl. No. 13/866,699, dated Feb. 7, 2014, 15 pages.
"Non-Final Office Action", U.S. Appl. No. 13/316,351, dated Feb. 14, 2013, 16 pages.
"Final Office Action", U.S. Appl. No. 13/411,859, dated Aug. 8, 2014, 16 pages.
"Non-Final Office Action", U.S. Appl. No. 14/108,008, dated Aug. 14, 2014, 16 pages.
"International Search Report and Written Opinion", Application No. PCT/US2013/035348, dated Sep. 25, 2013, 16 pages.
"Non-Final Office Action", U.S. Appl. No. 13/411,859, dated Nov. 5, 2014, 16 pages.
"Non-Final Office Action", U.S. Appl. No. 13/025,180, dated Jan. 15, 2015, 17 pages.
"Non-Final Office Action", U.S. Appl. No. 13/025,180, dated Apr. 5, 2013, 17 pages.
"Non-Final Office Action", U.S. Appl. No. 10/396,653, dated Sep. 6, 2007, 17 pages.
"Non-Final Office Action", U.S. Appl. No. 12/794,406, dated Sep. 14, 2012, 17 pages.
"Notice of Allowance", U.S. Appl. No. 13/482,867, dated Sep. 30, 2014, 17 pages.
"International Search Report and Written Opinion", Application No. PCT/US2013/038710, dated Jan. 8, 2014, 18 pages.
"Final Office Action", U.S. Appl. No. 13/363,689, dated Feb. 11, 2014, 18 pages.
"Final Office Action", U.S. Appl. No. 10/396,653, dated Feb. 26, 2007, 18 pages.
"Non-Final Office Action", U.S. Appl. No. 13/331,886, dated Jun. 19, 2014, 18 pages.
"Non-Final Office Action", U.S. Appl. No. 13/363,689, dated Jul. 26, 2013, 18 pages.
"Non-Final Office Action", U.S. Appl. No. 13/441,228, dated Oct. 2, 2014, 18 pages.
"Non-Final Office Action", U.S. Appl. No. 11/626,794, dated Dec. 23, 2008, 18 pages.
"Final Office Action", U.S. Appl. No. 13/331,886, dated Jan. 7, 2015, 19 pages.
"GWindows: Light-Weight Stereo Vision for Interaction", http://research.microsoft.com/~nuria/gwindows/htm, Jul. 8, 2005, 2 pages.
"Foreign Office Action", CA Application No. 2,775,700, dated Aug. 24, 2012, 2 pages.
"Final Office Action", U.S. Appl. No. 10/396,653, dated Feb. 25, 2008, 20 pages.
"Final Office Action", U.S. Appl. No. 13/316,351, dated Jul. 31, 2013, 20 pages.
"Final Office Action", U.S. Appl. No. 13/025,180, dated Mar. 14, 2014, 21 pages.
"Non-Final Office Action", U.S. Appl. No. 13/363,689, dated Sep. 15, 2014, 21 pages.
"Non-Final Office Action", U.S. Appl. No. 13/316,351, dated Jun. 19, 2014, 23 pages.
"Final Office Action", U.S. Appl. No. 13/316,351, dated Nov. 14, 2014, 23 pages.
"Non-Final Office Action", U.S. Appl. No. 10/396,653, dated Sep. 19, 2006, 24 pages.
"Final Office Action", U.S. Appl. No. 13/439,284, dated Jun. 3, 2013, 27 pages.
"Supplementary European Search Report", European Patent Application No. 12194891.3, dated Apr. 4, 2013, 3 pages.
"Search Report", EP Application No. 12195349.1, dated Apr. 22, 2013, 3 pages.
"Advisory Action", U.S. Appl. No. 10/396,653, dated May 2, 2007, 3 pages.
"Advisory Action", U.S. Appl. No. 10/396,653, dated May 23, 2008, 3 pages.
"Advisory Action", U.S. Appl. No. 13/025,180, dated Jul. 3, 2014, 3 pages.
"Corrected Notice of Allowance", U.S. Appl. No. 13/309,859, dated Oct. 29, 2013, 3 pages.
"Foreign Office Action", CA Application No. 2,775,814, dated Dec. 14, 2012, 3 pages.
"International Search Report", Application No. PCT/US2010/036005, dated Dec. 24, 2010, 3 pages.
"Foreign Office Action", CA Application No. 2,775,814, dated Aug. 24, 2012, 3 pages.
"Non-Final Office Action", U.S. Appl. No. 13/439,284, dated Feb. 25, 2013, 31 pages.
"Recognizing Visual Focus of Attention from Head Pose in Natural Meetings", IEEE Transactions on Systems, Man, and Cybernetics, Part B: Cybernetics—Special Issue on Human Computing, vol. 39, Issue 1, Feb. 2009, 36 pages.
"U.S. Appl. No. 12/794,406", filed Jun. 4, 2010, Jun. 4, 2010, 37 pages.
"Definition of "Synchronize"", Retrieved from <http://dictionary.reference.com/browse/synchronize?s=t> on Jan. 7, 2015, Jan. 7, 2015, 4 pages.
"Notice of Allowance", U.S. Appl. No. 11/626,794, dated May 13, 2010, 4 pages.
"Definition of "Subscribe"", Retrieved from <http://dictionary.reference.com/browse/subscribe?s=t> on Jan. 7, 2015, Jan. 7, 2015, 5 pages.
"Foreign Office Action", EP Application No. 12194891.3, dated Apr. 24, 2013, 5 pages.
"Restriction Requirement", U.S. Appl. No. 13/488,046, dated May 2, 2013, 5 pages.
"Restriction Requirement", U.S. Appl. No. 13/039,024, dated Oct. 1, 2013, 5 pages.
"Foreign Office Action", EP Application No. 12195349.1, dated May 10, 2013, 5 pages.

(56) References Cited

OTHER PUBLICATIONS

"Notice of Allowance", U.S. Appl. No. 13/439,284, dated Jul. 21, 2014, 6 pages.
"Restriction Requirement", U.S. Appl. No. 13/482,867, dated Sep. 6, 2013, 6 pages.
"Restriction Requirement", U.S. Appl. No. 13/114,359, dated Sep. 10, 2013, 6 pages.
"Restriction Requirement", U.S. Appl. No. 13/114,359, dated Dec. 18, 2013, 6 pages.
"Notice of Allowance", U.S. Appl. No. 13/866,699, dated Sep. 17, 2014, 6 pages.
"Notice of Allowance", U.S. Appl. No. 13/118,884, dated Feb. 4, 2014, 7 pages.
"Non-Final Office Action", U.S. Appl. No. 13/093,621, dated Jun. 20, 2013, 7 pages.
"Notice of Allowance", U.S. Appl. No. 13/093,621, dated Aug. 21, 2013, 7 pages.
"Notice of Allowance", U.S. Appl. No. 13/309,859, dated Sep. 4, 2013, 7 pages.
"Summons to Attend Oral Proceedings", EP Application No. 12194891.3, dated Sep. 17, 2014, 7 Pages.
"Summons to Attend Oral Proceedings", EP Application No. 12195349.1, dated Sep. 17, 2014, 7 Pages.
"Non-Final Office Action", U.S. Appl. No. 13/114,359, dated Oct. 20, 2014, 7 pages.
"Notice of Allowance", U.S. Appl. No. 10/396,653, dated Nov. 19, 2009, 7 pages.
"Non-Final Office Action", U.S. Appl. No. 13/488,046, dated Jun. 13, 2013, 8 pages.
"Notice of Allowance", U.S. Appl. No. 12/474,453, dated Dec. 12, 2012, 8 pages.
"Final Office Action", U.S. Appl. No. 14/108,008, dated Feb. 3, 2015, 9 pages.
"Response to Office Action", U.S. Appl. No. 12/794,406, dated Jul. 22, 2013, 9 pages.
"International Search Report and Written Opinion", Application No. PCT/US2012/034641, dated Nov. 30, 2012, 9 pages.
"Application Titled "Interaction with Networked Screen Content Via Motion Sensing Device in Retail Setting"", U.S. Appl. No. 13/025,180, filed Feb. 11, 2011, pp. 1-23.
"Application Titled "Controlling Electronic Devices in a Multimedia System Through a Natural User Interface"", U.S. Appl. No. 13/038,024, filed Mar. 2, 2011, pp. 1-46.
"The Case for Kinect", Eurogamer [online] Retrieved from the Internet on Aug. 20, 2010: URL:<http://www.eurogamer.net/articles/digitalfoundry-the-case-for-kinect-article?page=2>., Aug. 7, 2010, pp. 1-7.
"Future Media Internet Research Challenges and the Road Ahead", European Commission Information Society and Media, Available at <http://www.gatv.ssr.upm.es/nextmedia/images/fmi-tf-white_paper_042010.pdf>,Apr. 2010, 31 pages.
"Simulation and Training", Division Incorporated,1994, 6 Pages.
"Signal Processing Institute", http://ltswww.epfl.ch/~alahi/student_projects/proposals.shtml#4, Downloaded Feb. 2, 2009, 4 pages.
"Commanding Overview", MSDN, retrieved from <http://msdn.microsoft.com/en-us/library/ms752308.aspx> on Sep. 27, 2011,Sep. 27, 2011, 11 pages.
"KinEmote uses Kinect to translate key strokes for Windows applications", techshout.com [online], Retrieved from the Internet:<URL:http://www.techshout.com/gaming/2010/28/kinemote-uses-kinect-to-translate-key-strokes-for-windows-applications/>, Dec. 28, 2010, 2 pages.
"Affdex: Measuring Emotion over the Web", Affectiva, Retrieved from: <http://www.affectiva.com/affdex/> on Nov. 4, 2011, 3 pages.
Agarwal, et al., "High Precision Multi-touch Sensing on Surfaces using Overhead Cameras", Second Annual IEEE International Workshop on Horizontal Interactive Human-Computer System, available at <<http://ieeexplore.ieee.org/stamp/stamp.jsp?tp=&arnumber=4384130>>, Nov. 19, 2007, 4 pages.

Aggarwal, et al., "Human Motion Analysis: A Review", IEEE Nonrigid and Articulated motion Workshop, University of Texas at Austin, Austin, TX., 1997, pp. 90-102.
Ali, et al., "Real-Time Self-Calibrating Stereo Person Tracking Using 3-D Shape Estimation from Blob Features", Proceedings of ICPR, Vienna, Austria, Aug. 1996, pp. 627-632.
Althoff, et al., "Using Multimodal Interaction to Navigate in Arbitrary Virtual VRML Worlds", PUI 2001 Orlando, FL USA, available at <http://citeseerx.ist.psu.edu/viewdoc/download?doi=10.1.1.16.8034&rep=rep1&type=pdf>,2001, 8 pages.
Argyros, et al., "Vision-Based Interpretation of Hand Gestures for Remote Control of a Computer Mouse", Retrieved from: <http://www.ics.forth.gr/~argyros/mypapers/2006_05_hci_virtualmouse.pdf> on Oct. 31, 2007, 2006, pp. 40-51.
Asteriadis, et al., "Estimation of Behavioral User State based on Eye Gaze and Head Pose—Application in an e-Learning Environment", Journal of Multimedia Tools and Applications, vol. 41, Issue 3, Feb. 2009, 25 pages.
Azarbayejani, et al., "Visually Controlled Graphics", IEEE Transactions on Pattern Analysis and Machine Intelligence, vol. 15, No. 6, Jun. 1993, pp. 602-605.
Azoz, et al., "Reliable Tracking of Human Arm Dynamics by Multiple Cue Integration and Constraint Fusion", IEEE Conference on Computer Vision and Pattern Recognition, 1998, 6 pages.
Ba, et al., "Head Pose Tracking and Focus of Attention Recognition Algorithms in Meeting Rooms", Proceedings of the 1st International Evaluation Conference on Classification of Events, Activities and Relationships, Apr. 6, 2006, 12 pages.
Baudel, et al., "Charade: Remote Control of Objects using Free-Hand Gestures", Communications of the ACM, vol. 36. No. 7, Jul. 1993, 10 pages.
Becker, "Sensei: A Real-Time Recognition, Feedback and Training System for T'ai Chi Gestures", http://citeseer.ist.psu.edu/cache/papers/cs/405/ftp:zSzzSzwhitechapel.media.mit.eduzSzpubzSztech-reporterzsSzTR-426pdf/becker97sensei.pdf, Jun. 1993, 50 pages.
Berard, "The Perceptual Window-Head Motion as a New Input Stream", Proceedings of the Seventh IFIP Conference of Human-Computer Interaction, 1999, 238-244.
Bhuiyan, et al., "Gesture-controlled user interfaces, what have we done and what's next?", Retrieved at <<http://www.newi.ac.uk/computing/research/pubs/SEIN_BP.pdf>>, Nov. 27, 2009, 10 pages.
Bobic, "Rotating Objects Using Quaternions", Retrieved from the Internet on Aug. 20, 2010: URL http://www.gamasutra.com/view/feature/3278/rotating_objects_quarternions.php?page=2 >., Jul. 5, 1998, 14 pages.
Boser, et al., "A Training Algorithm for Optimal Margin Classifiers", Proceedings of the Fifth Annual Workshop on Computational Learning Theory, Jul. 27, 1992, 9 pages.
Boverie, et al., "Comparison of Structured Light and Stereovision Sensors for New Airbag Generations", Control Engineering Practice vol. 11, Issue 12 (2003), available at <<http://homepages.laas.fr/lerasle/pdf/cep03.pdf>>, Dec. 2003, pp. 1413-1421.
Bowman, et al., "New Directions in 3D User Interfaces", The International Journal of Virtual Reality, retrieved from <http://citeseerx.ist.psu.edu/viewdoc/download?doi=10.1.1.99.1121&rep=rep1&type=pdf> on Nov. 15, 2011,2006, pp. 3-14.
Bradley, et al., "Measuring Emotion: The Self-Assessment Manikin and the Semantic Differential", In Journal of Behavior Therapy and Experimental Psychiatry, vol. 25, Issue 1, Mar. 1994, 11 pages.
Breen, et al., "Interactive Occlusion and Collision of Real and Virtual Objects in Augmented Reality", Technical report ECRC-95-02 European Computer-Industry Research Centre GmbH, Munich, Germany, 1995, 22 Pages.
Brogan, et al., "Dynamically Simulated Characters in Virtual Environments", vol. 18, Issue 5, IEEE Computer Graphics and Applications, Sep./Oct. 1998, pp. 58-69.
Buxton, et al., "A Study of Two-Handed Input", Proceedings of CHI'86, 1986, pp. 321-326.
Cedras, et al., "Motion-based Recognition: A Survey", IEEE Proceedings, Image and Vision Computing, vol. 13, No. 2, Mar. 1995, pp. 129-155.

(56) References Cited

OTHER PUBLICATIONS

Chang, et al., "LIBSVM: A Library for Support Vector Machines", retrieved from <http://www.csie.ntu.edu.tw/~cjlin/libsvm/> on Apr. 1, 2013, 4 pages.
Crawford, "How Microsoft Kinect Works", Howstuffworks[online] Retrieved from the Internet on Aug. 19, 2010: URL: <http://electronics.howstuffworks.com/microsoft-kinect.htm/printable>., pp. 1-5.
Dalton, et al., "Sensing User Intention and Context for Energy Management", Duke University, Department of Computer Science, Retrieved from the Internet<URL:http://www.cs.duke/edu/ari/millywatt/faceoff.pdf>, Feb. 23, 2003, 5 pages.
Darrell, et al., "Integrated Person Tracking Using Stereo, Color and Pattern Detection", Proceedings of the Conference on Computer Vision and Pattern Recognition, 1998, pp. 601-609.
El et al., "Real Time Inference of Complex Mental States from Facial Expressions and Head Gestures", Proceedings of Conference on Computer Vision and Pattern Recognition Workshop, Jun. 27, 2004, 20 pages.
Fisher, et al., "Virtual Environment Display System", ACM Workshop on Interactive 3D Graphics, Chapel Hill, NC, Oct. 1986, 12 Pages.
Fitzgerald, et al., "Multimodal Event Parsing for Intelligent User Interfaces", IUI Conference, Jan. 2003, 8 pages.
Fitzgerald, et al., "Integration of Kinematic Analysis into Computer Games for Exercise", Proceedings of CGames 2006—9th International Conference on Computer Games: AI, Animation, Mobile, Educational and Serious Games, Dublin Ireland, Nov. 2006, pp. 24-28.
Freed, "Toys Keeping in Touch: Technologies for Distance Play", Retrieved from <<http://people.ischool.berkeley.edu/~daniela/tei2010/gsc09e-freed.pdf>>, Jan. 24, 2010, 2 pages.
Freeman, et al., "Television Control by Hand Gestures", International Workshop on Automatic Face and Gesture Recognition, 1995, pp. 179-183.
Gonzalez, "HDMI CEC", Home Theater University [online] Retrieved from the Internet:<URL:http://www.hometheatre.com/hookmeup/208hook>, Mar. 24, 2008, 3 pages.
Grace, et al., "A Drowsy Driver Detection System for Heavy Vehicles", Proceedings of the 17th Digital Avionics Systems Conference, vol. 2, Oct. 31, 1998, 8 pages.
Granieri, et al., "Simulating Humans in VR", The British Computer Society, Academic Press, Oct. 1994, 15 Pages.
Grunder, "Updated: Xbox 360 Kinect Hand Gesture Media Controls, Voice Control, TV Video Chat.", eHomeUpgrade [online] retrieved from the internet:<URL:http://www.ehomeupgrade.com/2010/06/14/updated-xbox-360-kinect-hand-gesture-media-controls-voice-control-tv-video-chat/>, Jun. 14, 2010, 8 pages.
Guiard, "Asymmetric Division of Labor in Human Skilled Bimanual Action: The Kinematic Chain as a Model", Journal of Motor Behavior, vol. 19 Issue 4, 1987, 486-517.
Guler, "Split and Merge Behavior Analysis and Understanding Using Hidden Markov Models", Oct. 8, 2002, 21 pages.
Guyon, et al., "An Introduction to Variable and Feature Selection", In Journal of Machine Learning Research, vol. 3, Mar. 2003, pp. 1157-1182.
Hardin, "Machine Vision Makes the Leap to Consumer Gaming", Machine Vision Online, retrieved from <<http://www.machinevisiononline.org/vision-resources-details.cfm?content_id=2398>> on Mar. 14, 2011,Dec. 8, 2010, 3 pages.
Hasegawa, et al., "Human-Scale Haptic Interaction with a Reactive Virtual Human in a Real-Time Physics Simulator", ACM Computers in Entertainment, vol. 4, No. 3, Jul. 2006, 12 Pages.
He, "Generation of Human Body Models", University of Auckland, New Zealand, Apr. 2005, 111 Pages.
Hongo, et al., "Focus of Attention for Face and Hand Gesture Recognition Using Multiple Cameras", 4th IEEE International Conference on Automatic Face and Gesture Recognition, Grenoble, France, Mar. 2000, pp. 156-161.
Horvitz, "Principles of Mixed-Initiative User Interfaces", Proceedings of CHI, 1999, 8 pages.
Horvitz, et al., "A Computational Architecture for Conversation", Proceedings of the Seventh International Conference on User Modeling, 1999, pp. 201-210.
Hourcade, "Architecture and Implementation of Java Package for Multiple Input Devices (MID)", HCIL Technical Report No. 99-08 (May 1999); http://www.cs.umd.edu/hcil, May 1999, 7 pages.
Isard, et al., "Condensation—Conditional Density Propagation for Visual Tracking", International Journal of Computer Vision 29(1), Netherlands, 1998, pp. 5-28.
Jacko, "HDI Dune Prime 3.0 Part 2.", Retrieved from the internet: <URL:http://www.jacko.my/2010/06/hdi-dune-prime-30-part-2.html>, Jun. 19, 2010, 15 pages.
Jojic, et al., "Detection and Estimation of Pointing Gestures in Dense Disparity Maps", Proceedings of IEEE International Conference on Automatic Face and Gesture Recognition, 2000, pp. 1000-1007.
Kabbash, et al., "The "Prince" Technique: Fitts' Law and Selection Using Area Cursors", Proceedings of CHI'95, http://www.billbuxton.com/prince.html, 1995, pp. 273-279.
Kanade, et al., "Development of Video-Rate Stereo Machine", Proceedings of 94 ARPA Image Understanding Workshop, 1994, pp. 549-558.
Kanade, et al., "A Stereo Machine for Video-rate Dense Depth Mapping and Its New Applications", IEEE Computer Society Conference on Computer Vision and Pattern Recognition, The Robotics Institute, Carnegie Mellon University, Pittsburgh, PA, 1996, pp. 196-202.
Kapoor, et al., "Multimodal Affect Recognition in Learning Environments", Proceedings of the 13th Annual ACM International Conference on Multimedia, Nov. 6, 2005, 6 pages.
Kim, et al., "Multi-Touch Tabletop Interface Technique for HCI", retrieved from <<http://210.119.33.7/apis6/paper/data/63-multi-touch%20tabl.pdf>> on Mar. 16, 2011, 4 pages.
Kjeldsen, "Visual Interpretation of Hand Gestures as Practical Interface Modality", Ph.D. Dissertation, Columbia University Department of Computer Science, 1997, 168 pages.
Klompmaker, "D5.1—State of the art analysis and recommendations on 'Context Awareness', 'Human Computer Interaction' and 'Mobile Users Interfaces'", Information Technology for European Advancement (ITEA), Local Mobile Services, Retrieved from the Internet<URL:http://www.loms-itea.org/deliverables/LOMS_D5.1_v1.0.pdy>, Jul. 2, 2007, 55 pages.
Kohler, "Special Topics of Gesture Recognition Applied in Intelligent Home Environments", In Proceedings of the Gesture Workshop, Germany, 1998, 12 Pages.
Kohler, "Technical Details and Ergonomical Aspects of Gesture Recognition applied in Intelligent Home Environments", Germany, 1997, 35 Pages.
Kohler, "Vision Based Remote Control in Intelligent Home Environments", University of Erlangen-Nuremberg, Germany, 1996, 8 Pages.
Kolsch, et al., "Vision-Based Interfaces for Mobility", Retrieved from <<http://ieeexplore.ieee.org/stamp/stamp.jsp?tp=&arnumber=1331713>>, Aug. 22, 2004, 9 pages.
Kwon, et al., "Combining Body Sensors and Visual Sensors for Motion Training", Computer Graphics Laboratory, http://graphics.ethz.ch/~dkwon/downloads/publications/ace05$_{13}$ ace.pdf, Downloaded 2009,2005, pp. 1-8.
Latoschik, "A User Interface Framework for Multimodal VR Interactions", ICMI'05, Trento, Italy, Oct. 4-6, 2005, available at <http://citeseerx.ist.psu.edu/viewdoc/download?doi=10.1.1.91.2941&rep=rep1&type=pdf>, Oct. 4, 2005, 8 pages.
Le, "EmuPlayer: Music Recommendation System Based on User Emotion Using Vital-sensor", Thesis, Keio University, Available at <http://www.sfc.wide.ad.jp/thesis/2011/files/sunny-publish-thesis.pdf>,2010, 85 pages.
Leal et al., "Initial Explorations into the User Experience of 3D File Browsing", Proceedings of HCI 2009, retrieved from <http://www.eecs.ucf.edu/isuelab/publications/pubs/p339-leal-3dfiles.pdf> on Nov. 15, 2011,Sep. 2009, pp. 339-344.

(56) References Cited

OTHER PUBLICATIONS

Li, et al., "A Near-Infrared Image Based Face Recognition System", available at <<http://www.cbsr.ia.ac.cn/Li%20Group/papers/IR-Face-FG06.pdf>>,Apr. 2006, 6 pages.

Liang, et al., "Face Alignment via Component-Based Discriminative Search", Computer Vision, ECCV 2008, Lecture Notes in Computer Science vol. 5303, 2008, 14 pages.

Livingston, "Vision-based Tracking with Dynamic Structured Light for Video See-through Augmented Reality", TheUniversity of NorthCarolina at ChapelHill, North Carolina, USA, 1998, 145 Pages.

Long, et al., "Implications for a Gesture Design Tool", Proceedings of CHI'99, 1999, pp. 40-47.

Maes, et al., "The ALIVE System: Wireless, Full-body, Interaction with Autonomous Agents", ACM Multimedia Systems, Special Issue on Multimedia and Multisensory Virtual Worlds, Nov. 1995, 17 pages.

Maltby, "Using Perspective in 3D File Management: Rotating Windows and Billboarded Icons", Proceedings of the International Conference on Computer Graphics, Imaging and Visualisation (CGIV'06), available at <http://ieeexplore.ieee.org/stamp/stamp.jsp?tp=&arnumber=1663764>,Jul. 28, 2006, 8 pages.

Martin, "VirHKey: A VIRtual Hyperbolic KEYboard with Gesture Interaction and Visual Feedback for Mobile Devices", http://delivery.acm.org/10.1145/1090000/1085794/p99-martin.pdf?key1=1085794&key2=4890534611&coll=portal&dl=ACM&CFID=11111111&CFTOKEN=2222222, Sep. 2005, 8 pages.

McCrae, et al., "Exploring the Design Space of Multiscale 3D Orientation", AVI '10, retrieved from <http://www.autodeskresearch.com/pdf/avi2010-final.pdf> on Nov. 15, 2011,May 29, 2010, 8 pages.

McDuff, "Affective Storytelling: Automatic Measurement of Story Effectiveness from Emotional Responses Collected over the Internet", PhD Thesis, retrieved from <http://web.media.mil.edu/~djmcduff/documents/McDuff_Thesis_Proposal.pdf> pdf,Jun. 6, 2012, 16 pages.

McDuff, et al., "Crowdsourcing Facial Responses to Online Videos", Proceedings of the IEEE Transactions on Affective Computing, vol. 3, Issue 4, Oct. 2012, pp. 456-468.

McDuff, et al., "AffectAura: An Intelligent System for Emotional Memory", In Proceedings of the SIGCHI Conference on Human Factors in Computing Systems, Retrieved from <http://www.affectiva.com/assets/Q-Sensor-Microsoft-Publication.pdf>,May 5, 2012, 10 pages.

Mignot, et al., "An Experimental Study of Future 'Natural' Multimodal Human-Computer Interaction", Proceedings of INTERCHI93, 1993, pp. 67-68.

Millan, et al., "Unsupervised Defect Segmentation of Patterned Materials under NIR Illumination", Journal of Physics: Conference Series 274 (2011) 012044, available at <<http://iopscience.iop.org/1742-6596/274/1/012044/pdf/1742-6596_274_1_012044.pdf>>,2011, 9 pages.

Minge, "Dynamics of User Experience", Workshop on Research Goals and Strategies for Studying User Experience and Emotion, Available at <http://www.cs.uta.fi/~ux-emotion/submissions/Minge.pdf>,2008, pp. 1-5.

Miyagawa, et al., "CCD-Based Range-Finding Sensor", IEEE Transactions on Electron Devices, vol. 44, No. 10, Oct. 1997, pp. 1648-1652.

Moeslund, et al., "A Survey of Computer Vision-Based Human Motion Capture", Computer Vision and Image Understanding: CVIU, vol. 81, No. 3, 2001, pp. 231-269.

Morency, et al., "Contextual Recognition of Head Gestures", Trento, Italy http://delivery.acm.org/10.1145/1090000/1088470/p18_morency.pdf?key1=1088470&key2=8870534611&coll=portal&dl=ACM&CFID=11111111&CFTOKEN=2222222, Oct. 2005, 7 pages.

Morrison, "A Camera-Based Touch Interface for Pervasive Displays", Retrieved from <<http://ubicomp.algoritmi.uminho.pt/perdisplay/docs/Morrison-Camera%20Touch_SV_Rev1.pdf>> on Mar. 16, 2011, 7 pages.

Moscovich, "Multi-touch Interaction", Brown University, CHI 2006, Apr. 22-27, 2006, Montreal, Quebec, Canada, Apr. 22, 2006, 4 pages.

Moyle, et al., "Gesture Navigation: An Alternative 'Back' for the Future", Proceedings of CHI'02, 2002, pp. 882-823.

Nielsen, et al., "A Procedure for Developing Intuitive and Ergonomic Gesture Interfaces for Man-Machine Interaction", Technical Report CVMT 03-01, ISSN 1601-3646. CVMT, Aalborg University, Mar. 2003, 12 pages.

Oh, et al., "Evaluating Look-to-talk: A Gaze-Aware Interface in a Collaborative Environment", CHI'02, 2002, 650-651.

Op et al., "Supporting Engagement and Floor Control in Hybrid Meetings", In Cross-Modal Analysis of Speech, Gestures, Gaze and Facial Expressions, Jul. 2009, 15 pages.

Oviatt, "Ten Myths of Multimodal Interaction", Communications of the ACM. vol. 42, No. 11, Nov. 1999, 8 pages.

Paquit, et al., "Near-Infrared Imaging and Structured Light Ranging for Automatic Catheter Insertion", Proceedings of SPIE vol. 6141, 61411T, (2006), available at <<http://www.cs.rpi.edu/~chakrn2/work/catheter_plan/paquit_06.pdf>>,2006, 9 pages.

Parrish, "Microsoft Does Want Core Games, FPS for Kinect", Tom's Guide: Tech for Real Life [online], Retrieved from the Internet on Aug. 20, 2010: URL: <http://www.tomsguide.com/us/Core-Gamers-Kinect-FPS-Action,news-7195.html>., Jun. 23, 2010, 1 page.

Pavlou, et al., "Measuring the Effects and Effectiveness of Interactive Advertising: A Research Agenda", Journal of Interactive Advertising, vol. 1, No. 1 (Fall 2000), Available at <http://scholar.google.co.in/scholar_url?hl=en&q=http://jiad.org/download%3Fp%3D6&sa=X&scisig=AAGBfm3He5PA4sgMGDXTyQuqaVQn4Q3nZw&oi=scholarr>, Oct. 2000, pp. 62-78.

Pavlovic, et al., "Visual Interpretation of Hand Gestures for Human-Computer Interaction: A Review", IEEE Transactions on Pattern Analysis and Machine Intelligence, vol. 19, No. 7, Jul. 1997, pp. 677-695.

Peacock, et al., "Which Broadcast Medium Better Drives Engagement? Measuring the Powers of Radio and Television with Electromyography and Skin-Conductance Measurements", In Journal of Advertising Research, vol. 51, Issue 4, Dec. 2011, 8 pages.

Poels, et al., "How to Capture the Heart? Reviewing 20 Years of Emotion Measurement in Advertising", In the Journal of Advertising Research, vol. 46, Issue 1, Mar. 2006, 48 pages.

Qian, et al., "A Gesture-Driven Multimodal Interactive Dance System", IEEE International Conference on Multimedia and Expo, Taipei, Jun. 2004, pp. 1579-1582.

Raymer, "Gestures and Words: Facilitating Recovery in Aphasia", The ASHA Leader, http://www.asha.org/about/publications/leader-online/archives/2007/070619/f070619a.htm, Jun. 19, 2007, 6 pages.

Rigoll, et al., "High Performance Real-Time Gesture Recognition Using Hidden Markov Models", Gesture and Sign Language in Human-Computer Interaction, vol. LNAI 1371, Frohlich, ed., 1997, pp. 69-80.

Rosenhahn, et al., "Automatic Human Model Generation", University of Auckland (CITR), New Zealand, 2005, pp. 41-48.

Sakir, "Kinect is your personal trainer in EA Sports Active 2", Gamerss [online] Retrieved from the Internet on Aug. 20, 2010: URL: <http://www.gamerss.co.uk/kinect-is-your-personal-trainer-in-ea-sports-active-2>., Jul. 26, 2010, 4 pages.

Schick, et al., "Extending Touch: Towards Interaction with Large-Scale Surfaces", ITS '09, Nov. 23-25, 2009, Banff, Alberta, Canada, available at <<http://www.iosb.fraunhofer.de/servlet/is/33404/urn_nbn_de_0011-n-1159494.pdf>>, Nov. 23, 2009, 8 pages.

Schielel, "A Home System Leaves Hand Controls in the Dust, Kinect by Microsoft Keeps You Entertained Hands Free", The New York Times [online] Retrieved from the Internet:<URL:http://www.nytimes.com/2010/11/04/arts/television/04kinect.html>, Nov. 4, 2010, 3 pages.

(56) References Cited

OTHER PUBLICATIONS

Shao, et al., "An Open System Architecture for a Multimedia and Multimodal User Interface", Japanese Society for Rehabilitation of Persons with Disabilities (JSRPD), Japan, Aug. 24, 1998, 8 Pages.
Sharma, et al., "Method of Visual and Acoustic Signal Co-Analysis for Co-Verbal Gesture Recognition", U.S. Appl. No. 60/413,998, filed Sep. 19, 2002, 16 pages.
Sharma, et al., "Speech-Gesture Driven Multimodal Interfaces for Crisis Management", Proceedings of IEEE Special Issue on Multimodal Human-Computer Interface, 2003, 28 pages.
Shen, et al., "Dita: Enabling Gesture-Based Human-Device Interaction using Mobile Phone", Retrieved at <<:http://research.microsoft.com/en-us/people/jackysh/dita.pdf>>, Oct. 1, 2010, pp. 1-14.
Sheridan, et al., "Virtual Reality Check", Technology Review, vol. 96, No. 7, Oct. 1993, 9 Pages.
Shivappa, et al., "Person Tracking with Audio-Visual Cues Using the Iterative Decoding Framework", IEEE Fifth International Conference on Advanced Video and Signal Based Surveillance, AVSS 08, Santa Fe, NM, Sep. 2008, 260-267.
Simeone, et al., "Toys++ AR Embodied Agents as Tools to Learn by Building", Retrieved from <<http://ieeexplore.ieee.org/stamp/stamp.jsp?arnumber=05572598>>, Jul. 5, 2010, 2 pages.
Stevens, "Flights into Virtual Reality Treating Real World Disorders", The Washington Post, Science Psychology, Mar. 27, 1995, 2 Pages.
Tep, et al., "Web Site Quality Evaluation Combining Eyetracking and Physiologicial Measures to Self-Reported Emotions: An Exploratory Research", Proceedings of Measuring Behavior 2008 (Maastricht, The Netherlands, Aug. 26-29, 2008), Retrieved from: <http://www.noldus.com/mb2008/individual_papers/FPS_eye_tracking/FPS_eye_tracking_Prom-Tep.pdf> on Oct. 4, 2011,Aug. 26, 2008, pp. 224-225.
Tilley, "E3 09: Project Natal exposed", Load This [online] Retrieved from the Internet:<URL:http://blogs.canoe.ca/loadthis/general/e3-09-project-natal-exposed/>, Jun. 1, 2009, 4 pages.
Todd, "Google Campaign Insights: Better Measurement for Display Advertising", Retrieved from: <http://adwordsagency.blogspot.com/2009/10/campaign-insights-better-measurement.html> on Nov. 14, 2011,Oct. 19, 2009, 3 pages.
Toyama, et al., "Probabilistic Tracking in a Metric Space", Eighth International Conference on Computer Vision, Vancouver Canada, vol. 2, Jul. 2001, 8 pages.
Tresadern, et al., "Visual Analysis of Articulated Motion", DPhil Thesis, University of Oxford, Oxford, U.K., Oct. 12, 2006, 1-171.
Vaucelle, et al., "Picture This! Film Assembly Using Toy Gestures", Retrieved from <<http://web.media.mit.edu/~cati/PictureThis_Ubicomp.pdf>>, 2008, 10 pages.
Viola, et al., "Robust Real-Time Face Detection", In International Journal of Computer Vision, vol. 57, Issue 2, May 2004, 18 pages.
Voit, et al., "Deducing the Visual Focus of Attention from Head Pose Estimation in Dynamic Multi-View Meeting Scenarios", Proceedings of the 1oth International Conference on Multimodal Interfaces, Oct. 20, 2008, 8 pages.
Walker, et al., "Age Related Differences in Movement Control: Adjusting Submovement Structure to Optimize Performance", Journals of Gerontology, Jan. 1997, pp. 40-52.
Wedel, et al., "Eye Fixations on Advertisements and Memory for Brands: A Model and Findings", Journal of Marketing Science, vol. 19, Issue 4, Oct. 2000, pp. 297-312.
Welford, "Signal, Noise, Performance, and Age.", Human Factors, vol. 23, Issue 1, http://www.ingentaconnect.com/content/hfes/hf/1981/00000023/00000001/art0009, 1981, pp. 97-109.
Wilson, et al., "Hidden Markov Models for Modeling and Recognizing Gesture Under Variation", Hidden Markov Model: Applications in Computer Vision., T. Caelli, ed. World Scientific, 2001, 36 pages.
Wilson, et al., "GWindows: Towards Robust Perception-Based UI", Microsoft Research, 2003, pp. 1-8.

Wood, "Using Faces: Measuring Emotional Engagement for Early Stage Creative", In ESOMAR, Best Methodology, Annual Congress, Sep. 19, 2007, 29 pages.
Worden, et al., "Making Computers Easier for Older Adults to Use: Area Cursors and Sticky Icons", CHI 97, Atlanta Georgia, USA, 1997, pp. 266-271.
Wren, et al., "Pfinder: Real-Time Tracking of the Human Body", IEEE Transactions on Pattern Analysis and Machine Intelligence, vol. 19, No. 7, Jul. 1997, pp. 780-785.
Yakut, et al., "User and Task Analysis of Multi-Level 3D File Browser", Dept. of Computer Engineering, Bilkent University, Ankara, Turkey, retrieved from <http://www.cs.bilkent.edu.tr/~cansin/projects/cs560-3dui/multi-level-3d-file-browser/3dui-report.pdf> on Nov. 15, 2011, 4 pages.
Yoda, et al., "Utilization of Stereo Disparity and Optical Flow Information for Human Interaction", Proceedings of the Sixth International Conference on Computer Vision, IEEE Computer Society, Washington D.C., USA, 1998, 5 pages.
Zhai, et al., "The "Silk Cursor": Investigating Transparency for 3D Target Acquisition", CHI 94, 1994, pp. 273-279.
Zhang, "Flexible Camera Calibration by Viewing a Plane from Unknown Orientations", Microsoft Research, 1999, 8 pages.
Zhang, "A Flexible New Technique for Camera Calibration", IEEE Transactions on Pattern Analysis and Machine Intelligence, vol. 22, No. 11, Nov. 2000, pp. 1330-1334.
Zhang, et al., "Head Pose Estimation in Seminar Room Using Multi View Face Detectors", Proceedings of the 1st International Evaluation Conference on Classification of Events, Activities and Relationships, Mar. 30, 2006, 7 pages.
Zhao, "Dressed Human Modeling, Detection, and Parts Localization", The Robotics Institute, Carnegie Mellon University, Pittsburgh, PA, 2001, 121 Pages.
"Extended European Search Report", EP Application No. 13724078.4, dated May 13, 2015, 7 pages.
"Final Office Action", U.S. Appl. No. 13/114,359, dated Mar. 23, 2015, 12 pages.
"Final Office Action", U.S. Appl. No. 13/363,689, dated Apr. 24, 2015, 24 pages.
"Foreign Notice of Allowance", CN Application No. 201110159923.8, dated Dec. 2, 2014, 4 pages.
"Notice of Allowance", U.S. Appl. No. 12/794,406, dated Jan. 21, 2015, 11 pages.
"Notice of Allowance", U.S. Appl. No. 13/316,351, dated Mar. 25, 2015, 6 pages.
"Notice of Allowance", U.S. Appl. No. 14/108,008, dated May 11, 2015, 6 pages.
"Corrected Notice of Allowance", U.S. Appl. No. 13/316,351, dated Jul. 7, 2015, 3 pages.
"Final Office Action", U.S. Appl. No. 13/025,180, dated Apr. 24, 2015, 18 pages.
"Final Office Action", U.S. Appl. No. 13/331,886, dated Jul. 6, 2015, 20 pages.
"Final Office Action", U.S. Appl. No. 13/411,859, dated Jun. 3, 2015, 17 pages.
"Final Office Action", U.S. Appl. No. 13/441,228, dated May 21, 2015, 21 pages.
"Foreign Office Action", EP Application No. 13724078.4, dated Jun. 1, 2015, 1 Page.
"Non-Final Office Action", U.S. Appl. No. 13/039,024, dated Jul. 1, 2015, 18 pages.
"Foreign Office Action", CN Application No. 201310161449.1, dated Nov. 3, 2015, 14 pages.
"Final Office Action", U.S. Appl. No. 13/114,359, dated May 9, 2016, 12 pages.
"Final Office Action", U.S. Appl. No. 13/411,859, dated Feb. 19, 2016, 17 pages.
"Foreign Office Action", CN Application No. 201310115975.4, dated Apr. 7, 2016, 10 pages.
"Foreign Office Action", CN Application No. 201310161236.9, dated May 5, 2016, 16 pages.
"Foreign Office Action", EP Application No. 13717662.4, dated Jun. 8, 2016, 3 pages.

(56) References Cited

OTHER PUBLICATIONS

"Non-Final Office Action", U.S. Appl. No. 13/039,024, dated May 20, 2016, 17 pages.
"Non-Final Office Action", U.S. Appl. No. 13/331,886, dated Feb. 12, 2016, 19 pages.
"Non-Final Office Action", U.S. Appl. No. 13/363,689, dated Apr. 15, 2016, 16 pages.
"Non-Final Office Action", U.S. Appl. No. 14/815,321, dated Apr. 8, 2016, 19 pages.
"Notice of Allowance", U.S. Appl. No. 14/280,140, dated Feb. 25, 2016, 8 pages.
"Foreign Office Action", CN Application No. 201310113825.X, Jan. 4, 2016, 16 pages.
"Final Office Action", U.S. Appl. No. 13/039,024, dated Nov. 25, 2016, 19 pages.
"Foreign Office Action", Application No. MX/a/2014/013427, dated May 27, 2016, 3 pages.
"Foreign Office Action", CN Application No. 201310161236.9, dated Oct. 10, 2016, 7 pages.
"Foreign Office Action", EP Application No. 137176943.4, dated Oct. 5, 2016, 6 pages.
"Non-Final Office Action", U.S. Appl. No. 15/162,905, Nov. 23, 2016, 9 pages.
"Notice of Allowance", U.S. Appl. No. 14/815,321, Dec. 6, 2016, 5 pages.
"Final Office Action", U.S. Appl. No. 13/331,886, dated Aug. 26, 2016, 18 pages.
"Final Office Action", U.S. Appl. No. 14/815,321, dated Aug. 24, 2016, 24 pages.
"Foreign Office Action", CN Application No. 201310113825.X, dated Jul. 26, 2016, 14 pages.
"Foreign Office Action", TW Application No. 102110528, dated Sep. 1, 2016, 13 pages.
Potamitis,"An Integrated System for Smart-Home Control of Appliances Based on Remote Speech Interaction", In Proceedings of the 8th European Conference on Speech Communication and Technology (Eurospeech 2003), Geneva, Switzerland, Sep. 1-4, 2003, Jan. 2003, 4 pages.
"Corrected Notice of Allowance", U.S. Appl. No. 14/815,321, dated Jan. 17, 2017, 2 pages.
"Corrected Notice of Allowance", U.S. Appl. No. 14/815,321, dated Mar. 20, 2017, 2 pages.
"Corrected Notice of Allowance", U.S. Appl. No. 14/815,321, Dec. 23, 2016, 2 pages.
"Examiner's Answer to Appeal Brief", U.S. Appl. No. 13/114,359, dated Jan. 30, 2017, 17 pages.
"Foreign Notice of Allowance", CN Application No. 201310161236.9, dated Apr. 17, 2017, 4 pages.
"Foreign Notice of Allowance", TW Application No. 102110528, Dec. 16, 2016, 4 pages.
"Foreign Office Action", CN Application No. 201210052070.02, dated Feb. 3, 2017, 10 pages.
"Foreign Office Action", CN Application No. 201310113825.X, dated Jan. 13, 2017, 17 pages.
"Non-Final Office Action", U.S. Appl. No. 13/039,024, dated Feb. 8, 2017, 19 pages.
"Foreign Office Action", JP Application No. 2015-510501, dated May 19, 2017, 10 pages.
"Foreign Office Action", RU Application No. 2014144369, dated May 26, 2017, 14 pages.
"Non-Final Office Action", U.S. Appl. No. 15/162,905, dated May 1, 2017, 12 pages.
"Non-Final Office Action", U.S. Appl. No. 15/458,511, dated Jul. 26, 2017, 12 pages.
"Foreign Office Action", JP Application No. 2015-504691, dated Jun. 29, 2017, 15 pages.
"Foreign Office Action", CN Application No. 201310113825.X, dated Jun. 1, 2017, 8 pages.

* cited by examiner

1100

1102
Determine, Based on a Current Media Reaction to a Scene of a Media Program, a Type of the Media Program, and a Reaction History of a User, a Determined Advertisement of Multiple Potential Advertisements

1104
Cause the Determined Advertisement to be Presented Immediately After Completing Presentation of the Scene of the Media Program

Fig. 11

DETERMINING A FUTURE PORTION OF A CURRENTLY PRESENTED MEDIA PROGRAM

PRIORITY CLAIM

This application claims priority under 35 U.S.C. §119 to U.S. patent application Ser. No. 13/482,867, filed May 29, 2012 entitled "DETERMINING A FUTURE PORTION OF A CURRENTLY PRESENTED MEDIA PROGRAM" and Canadian Patent Application Serial No. 2,775,700 filed May 4, 2012 entitled "DETERMINING A FUTURE PORTION OF A CURRENTLY PRESENTED MEDIA PROGRAM," the disclosures of which are incorporated by reference in their entirety herein.

BACKGROUND

Currently, advertisers and media providers often test advertisements and other media programs prior to generally releasing the program. For example, a media provider may show small audiences a situation comedy after which the audience provides feedback through survey results or hand-tracked information logs. These surveys and logs, however, are often imprecise. The audience may not remember a funny joke at the third minute of a twenty-four-minute program, for example. And, even if the results include some precision, the size of the audience is typically small, which may not reliably indicate how the program will be received when generally released.

Media providers may also test programs through invasive biometric testing of an audience during presentation of the program in a controlled environment. This testing can be more precise, but the audience size is often much smaller than even survey and log testing. And, even this testing can be highly inaccurate due in part to the controlled environment in which the testing occurs—a person is less likely to laugh when in a sound room strapped to electrical testing devices than when relaxing in his or her home.

Furthermore, in either of these cases, the time-delay in altering a program can be substantial. It may take days or weeks to record a new program or alter a current program, and even when this is complete, the altered program may again be tested, further delaying release of the program.

SUMMARY

This document describes techniques and apparatuses for determining a future portion of a currently presented media program. The techniques and apparatuses can receive current media reactions of one or many people to a currently presented media program and determine later portions to present in the media program based on the media reactions. In some embodiments, for example, a program can be presented live, reactions can be received during the live presentation, and the program altered on-the-fly and in real time based on those reactions. Further, the alterations can be general or tailored to a group or a particular person.

This summary is provided to introduce simplified concepts for determining a future portion of a currently presented media program, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for determining a future portion of a currently presented media program are described with reference to the following drawings. The same numbers are used throughout the drawings to reference like features and components:

FIG. 11 illustrates methods for presenting an advertisement based on a current media reaction, including immediately following a scene in which the current media reaction was made.

DETAILED DESCRIPTION

Overview

This document describes techniques and apparatuses for determining a future portion of a currently presented media program. These techniques and apparatuses enable alterations to, or determinations of, portions of a media program during the presentation of that program.

Consider, for example, a situational comedy program being presented to many thousands of viewers. Assume that the media provider of this situational comedy prepared, in advance, multiple portions to present at certain points in the situational comedy—three different scenes at minute nineteen and four different ending scenes at the end of the program. The techniques may determine, based on media reactions during the presentation, which of the three scenes to present at minute nineteen and which of the four different scenes to present at the end. Which scenes are presented may be based on many media reactions to a prior scene, such as from thousands of viewers, or based on a person's or demographic group's reactions. By so doing, the techniques may alter the program for everyone or tailor the program to a group or a particular person. Thus, the techniques may present a scene having physical comedy to men aged 18-34 at minute nineteen based on that group's reaction to a prior scene having physical comedy, present a scene showing character development to women aged 35-44 based that group's reaction to a prior scene about the character, and show all audiences one of the four possible endings based on various reactions from all groups currently watching the program.

This is but one example of how techniques and/or apparatuses for determining a future portion of a currently presented media program can be performed. Techniques and/or apparatuses are referred to herein separately or in conjunction as the "techniques" as permitted by the context. This document now turns to an example environment in which the techniques can be embodied and then various example methods that can, but are not required to, work in conjunction with the techniques. Some of these various methods include methods for sensing reactions to media, building a reaction history for a user, and presenting advertisements based on current reactions. After these various methods, this document turns to example methods for determining a future portion of a currently presented media program.

Example Environment

Figure 1:
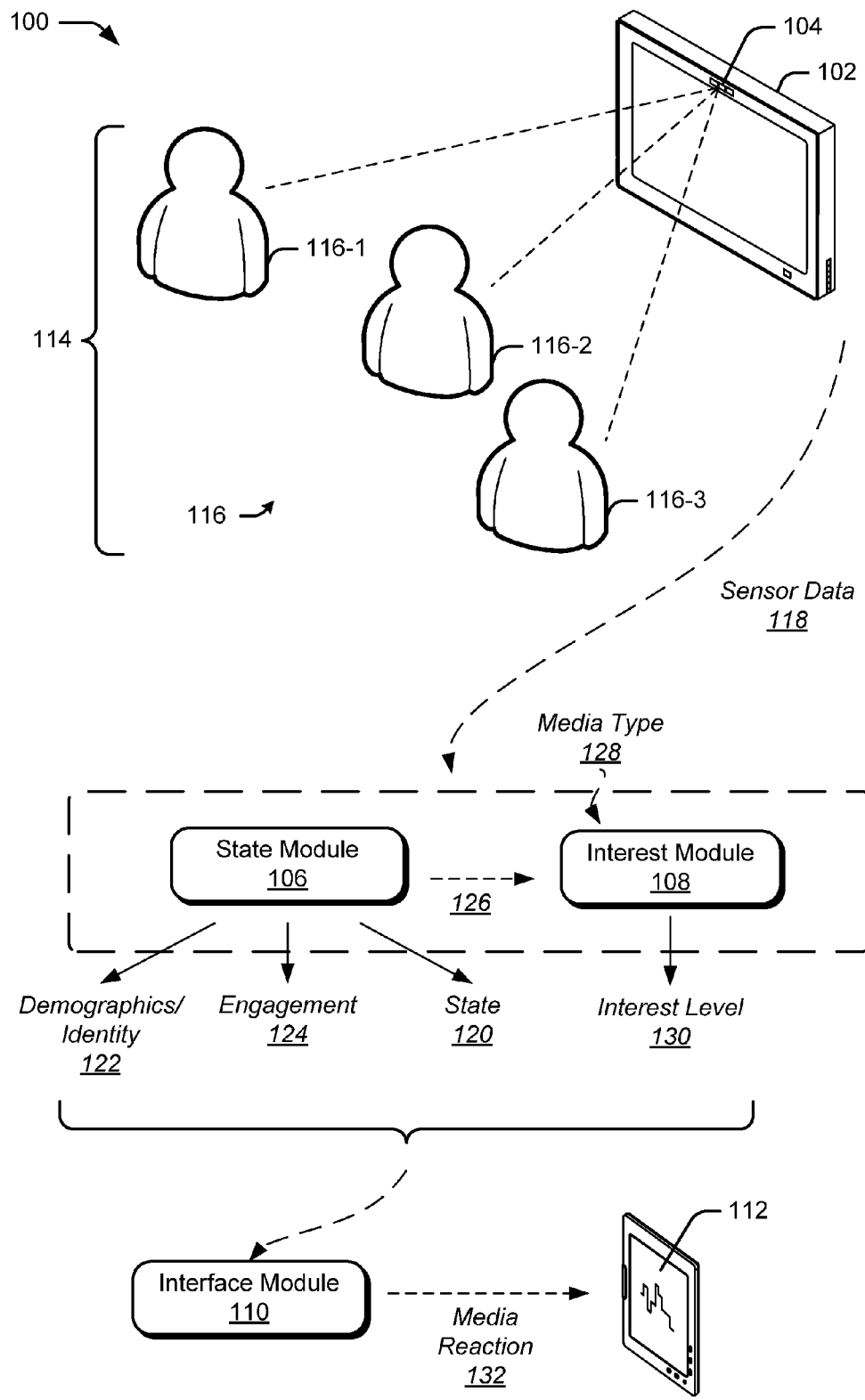
FIG. 1 illustrates an example environment in which techniques for determining a future portion of a currently presented media program can be implemented, as well as other techniques.

FIG. 1 is an illustration of an example environment 100 for receiving sensor data and determining media reactions based on this sensor data. These media reactions can be used to determine a future portion of a currently presented media program, as well as other uses. The techniques may use these media reactions alone or in combination with other information, such as demographics, reaction histories, and information about the media program or portion thereof.

Environment 100 includes a media presentation device 102, an audience-sensing device 104, a state module 106, an interest module 108, an interface module 110, and a user interface 112.

Media presentation device 102 presents a media program to an audience 114 having one or more users 116. A media program can include, alone or in combination, a television show, a movie, a music video, a video clip, an advertisement, a blog, a photograph, a web page, an e-book, an e-magazine, a computer game, a song, a tweet, or other audio and/or video media. Audience 114 can include one or more users 116 that are in locations enabling consumption of a media program presented by media presentation device 102 and measurement by audience-sensing device 104, whether separately or within one audience 114. In audience 114 three users are shown: user 116-1, user 116-2, and user 116-3.

Audience-sensing device 104 is capable of sensing audience 114 and providing sensor data for audience 114 to state module 106 and/or interest module 108 (sensor data 118 shown provided via an arrow). The data sensed can be sensed passively, actively, and/or responsive to an explicit request.

Passively sensed data is passive by not requiring active participation of users in the measurement of those users. Actively sensed data includes data recorded by users in an audience, such as with handwritten logs, and data sensed from users through biometric sensors worn by users in the audience. Sensor data sensed responsive to an explicit request can be sensed actively or passively. One example is an advertisement that requests, during the advertisement, that a user raises his or her hand if he or she would like a coupon for a free sample of a product to be sent to the user by mail. In such a case, the user is expressing a reaction of raising a hand, though this can be passively sensed by not requiring the user to actively participate in the measurement of the reaction. The techniques sense this raised hand in various manners as set forth below.

Sensor data can include data sensed using emitted light or other signals sent by audience-sensing device 104, such as with an infrared sensor bouncing emitted infrared light off of users or the audience space (e.g., a couch, walls, etc.) and sensing the light that returns. Examples of sensor data measuring a user and ways in which it can be measured are provided in greater detail below.

Audience-sensing device 104 may or may not process sensor data prior to providing it to state module 106 and/or interest module 108. Thus, sensor data may be or include raw data or processed data, such as: RGB (Red, Green, Blue) frames; infrared data frames; depth data; heart rate; respiration rate; a user's head orientation or movement (e.g., coordinates in three dimensions, x, y, z, and three angles, pitch, tilt, and yaw); facial (e.g., eyes, nose, and mouth) orientation, movement, or occlusion; skeleton's orientation, movement, or occlusion; audio, which may include information indicating orientation sufficient to determine from which user the audio originated or directly indicating which user, or what words were said, if any; thermal readings sufficient to determine or indicating presence and locations of one of users 116; and distance from the audience-sensing device 104 or media presentation device 102. In some cases audience-sensing device 104 includes infrared sensors (webcams, Kinect cameras), stereo microphones or directed audio microphones, and a thermal reader (in addition to infrared sensors), though other sensing apparatuses may also or instead be used.

State module 106 receives sensor data and determines, based on the sensor data, states 120 of users 116 in audience 114 (shown at arrow). States include, for example: sad, talking, disgusted, afraid, smiling, scowling, placid, surprised, angry, laughing, screaming, clapping, waving, cheering, looking away, looking toward, leaning away, leaning toward, asleep, or departed, to name just a few.

The talking state can be a general state indicating that a user is talking, though it may also include subcategories based on the content of the speech, such as talking about the media program (related talking) or talking that is unrelated to the media program (unrelated talking). State module 106 can determine which talking category through speech recognition.

State module 106 may also or instead determine, based on sensor data, a number of users, a user's identity and/or demographic data (shown at 122), or engagement (shown at 124) during presentation. Identity indicates a unique identity for one of users 116 in audience 114, such as Susan Brown. Demographic data classifies one of users 116, such as 5 feet, 4 inches tall, young child, and male or female. Engagement indicates whether a user is likely to be paying attention to the media program, such as based on that user's presence or head orientation. Engagement, in some cases, can be determined by state module 106 with lower-resolution or less-processed sensor data compared to that used to determine states. Even so, engagement can be useful in measuring an audience, whether on its own or to determine a user's interest using interest module 108.

Interest module 108 determines, based on sensor data 118 and/or a user's engagement or state (shown with engagement/state 126 at arrow) and information about the media program (shown at media type 128 at arrow), that user's interest level 130 (shown at arrow) in the media program. Interest module 108 may determine, for example, that multiple laughing states for a media program intended to be a serious drama indicate a low level of interest and conversely, that for a media program intended to be a comedy, that multiple laughing states indicate a high level of interest.

As illustrated in FIG. 1, state module 106 and/or interest module 108 provide demographics/identity 122 as well as one or more of the following media reactions: engagement 124, state 120, or interest level 130, all shown at arrows in FIG. 1. Based on one or more of these media reactions, state module 106 and/or interest module 108 may also provide another type of media reaction, that of overall media reactions to a media program, such as a rating (e.g., thumbs up or three stars). In some cases, however, media reactions are received and overall media reactions are determined instead by interface module 110.

Figure 2:
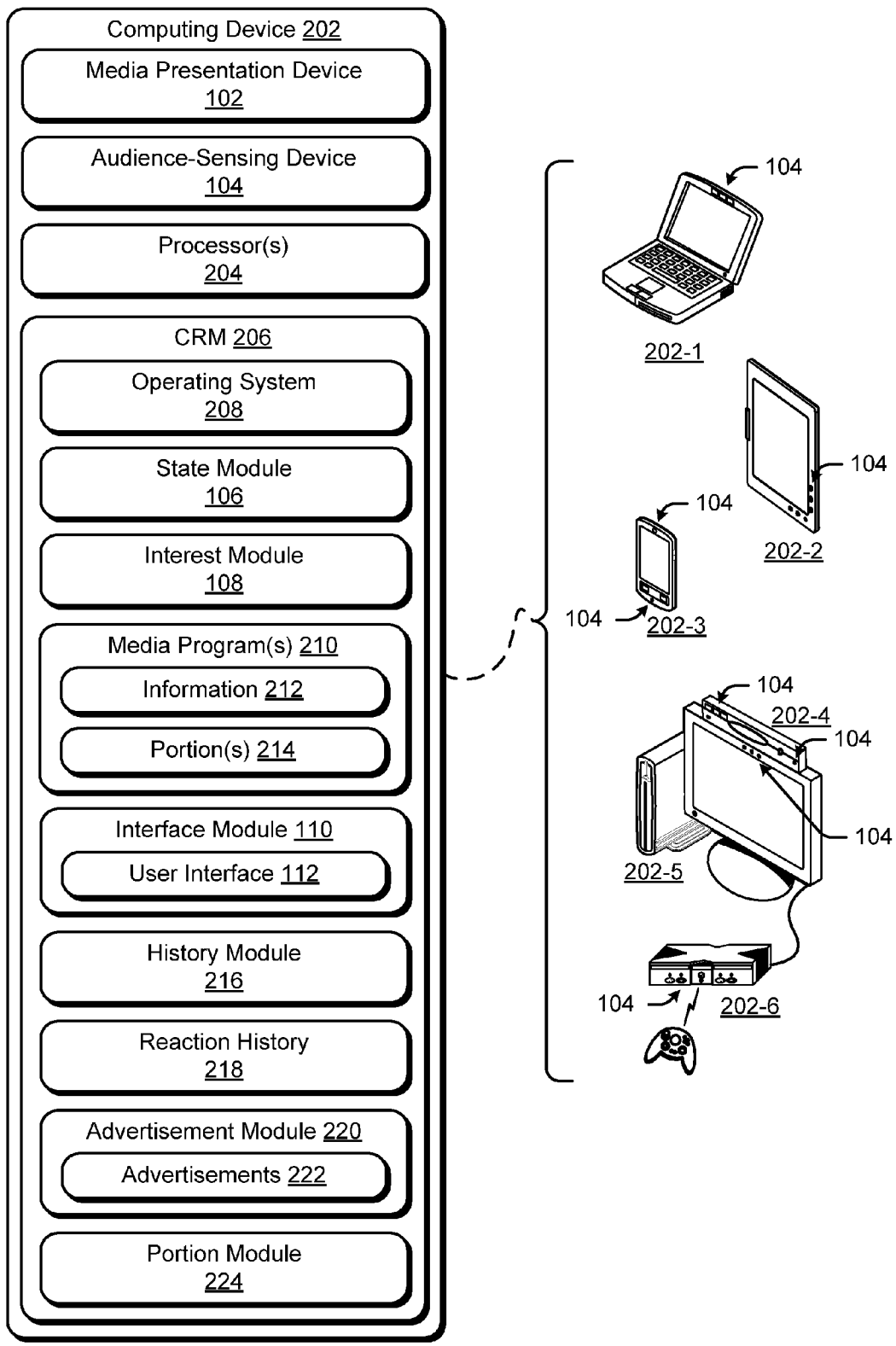
FIG. 2 is an illustration of an example computing device that is local to the audience of FIG. 1.
Figure 3:
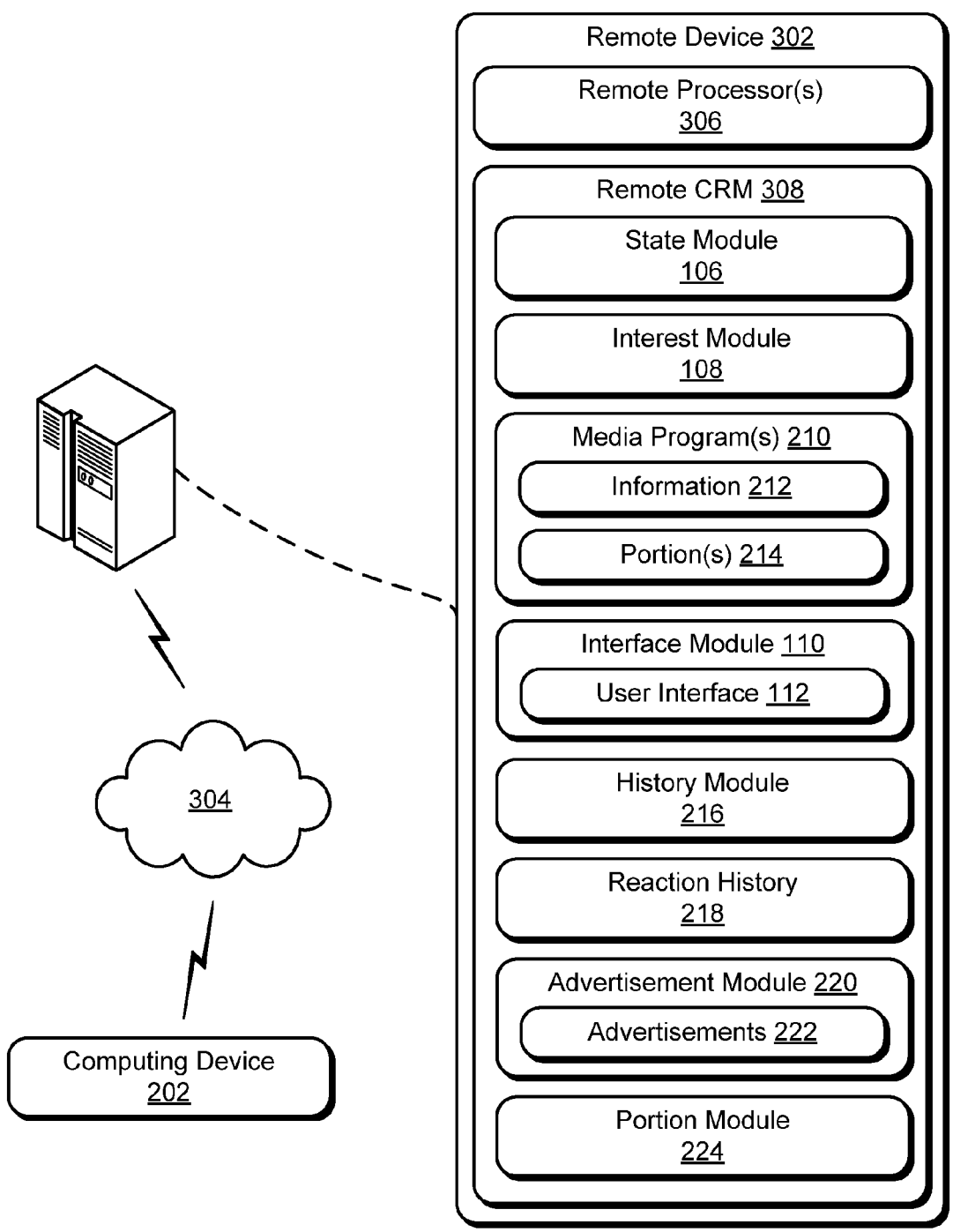
FIG. 3 is an illustration of an example remote computing device that is remote to the audience of FIG. 1.

State module 106 and interest module 108 can be local to audience 114, and thus media presentation device 102 and audience-sensing device 104, though this is not required. An example embodiment where state module 106 and interest module 108 are local to audience 114 is shown in FIG. 2. In some cases, however, state module 106 and/or interest module 108 are remote from audience 114, which is illustrated in FIG. 3.

Interface module 110 receives media reactions and demographics/identity information, and determines or receives some indication as to which media program or portion thereof that the reactions pertain. Interface module 110 presents, or causes to be presented, a media reaction 132 to a media program through user interface 112, though this is not required. This media reaction can be any of the above-mentioned reactions, some of which are presented in a time-based graph, through an avatar showing the reaction, or a video or audio of the user recorded during the reaction, one or more of which is effective to how a user's reaction over the course of the associated media program.

Interface module 110 can be local to audience 114, such as in cases where one user is viewing his or her own media reactions or those of a family member. In many cases, however, interface module 110 receives media reactions from a remote source.

Note that sensor data 118 may include a context in which a user is reacting to media or a current context for a user for which ratings or recommendations for media are requested. Thus, audience-sensing device 104 may sense that a second person is in the room or is otherwise in physical proximity to the first person, which can be context for the first person. Contexts may also be determined in other manners described in FIG. 2 below.

FIG. 2 is an illustration of an example computing device 202 that is local to audience 114. Computing device 202 includes or has access to media presentation device 102, audience-sensing device 104, one or more processors 204, and computer-readable storage media ("CRM") 206.

CRM 206 includes an operating system 208, state module 106, interest module 108, media program(s) 210, each of which may include or have associated program information 212 and portions 214, interface module 110, user interface 112, history module 216, reaction history 218, advertisement module 220, which may include multiple advertisements 222, and portion module 224.

Each of media programs 210 may have, include, or be associated with program information 212 and portions 214. Program information 212 can indicate the name, title, episode, author or artist, type of program, and other information, including relating to various portions within each media program 210. Thus, program information 212 may indicate that one of media programs 210 is a music video, includes a chorus portion that is repeated four times, includes a four verse portions, includes portions based on each visual presentation during the song, such as the artist singing, the backup singers dancing, the name of the music video, the artist, the year produced, resolution and formatting data, and so forth.

Portions 214 of one of media programs 210 make up the program or potentially may be used to make up the program. These portions may represent particular time-ranges in the media program, though they may instead be located in the program based on a prior portion ending (even if the time at which that portion ending is not necessarily set in advance). Example portions may be 15-second-long pieces, a song being played in a radio-like program, or a scene of a movie. These portions 214 may be arranged and/or set in a particular order, in which case one or more of portions 214 can be replaced by portion module 224 responsive to media reactions. These portions 214 may instead be prepared in advance but without a pre-set order. Thus, a media program, such as a 30-second advertisement, may have a previously-set first ten-second portion but have five alternative second portions of ten seconds, and fifteen alternative third portions of ten seconds, for example. In such a case, which portion is played from eleven to twenty seconds can be based on a media reaction of a person to the first ten-second portion. Then, based on one or both of the user's (or many users') reactions to the first portion and the second, the third portion playing from twenty-one to thirty seconds is determined.

Portion module 224, as noted in part above, receives a current media reaction or reactions of a user, a group of users, or many users to a portion of one of media programs 210. These media reactions may include one or more of engagements 124, states 120, and interest levels 130. With these media reactions, portion module 224 may determine a future portion of the currently presented media program to present. Note that this determination may be performed in real-time during the presentation of the media program, even effective to determine future portions of short advertisements based on current reactions to earlier portions of that same presentation of the advertisement. These future portions may be previously stored locally or remotely. The future portion to be presented may be received from the local store or received from a remote source, such as contemporaneously by streaming later portions of a currently presented media program from a remote source. As shown in FIGS. 2 and 3, media program 210, portions 214, and portion module 224 may be local or remote from computing device 202 and thus the user or users having the media reactions (e.g., user 116-1 of audience 114 of FIG. 1).

History module 216 includes or has access to reaction history 218. History module 216 may build and update reaction history 218 based on ongoing reactions by the user (or others as noted below) to media programs. In some cases history module 216 determines various contexts for a user, though this may instead be determined and received from other entities. Thus, in some cases history module 216 determines a time, a locale, weather at the locale, and so forth, during the user's reaction to a media program or request for ratings or recommendations for a media program. History module 216 may determine ratings and/or recommendations for media based on a current context for a user and reaction history 218. Reaction history 218, as noted elsewhere herein, may be used along with media reactions to determine future portions of a media program to present.

Advertisement module 220 receives a current media reaction of a user, such as one or more of engagements 124, states 120, or interest levels 130. With this current media reaction, advertisement module 220 may determine an advertisement of multiple advertisements 222 to present to the user. Advertisement module 220 may also or instead provide the current media reaction to advertisers, receive bids from advertisers for a right to present an advertisement, and then cause an advertisement to be presented to the user. This advertisement may be previously stored as one of advertisements 222 or received contemporaneously, such as by streaming the advertisement from a remote source responsive to the accompanying bid being a highest bid or another pricing structure indicating that the advertisement should be presented. Note that in either of these cases, advertisement module 220 may be local or remote from computing device 202 and thus the user (e.g., user 116-1 of audience 114 of FIG. 1).

Note that in this illustrated example, entities including media presentation device 102, audience-sensing device 104, state module 106, interest module 108, interface module 110, history module 216, advertisement module 220, and portion module 224 are included within a single computing device, such as a desktop computer having a display, forward-facing camera, microphones, audio output, and the like. Each of these entities, however, may be separate from or integral with each other in one or multiple computing devices or otherwise. As will be described in part below, media presentation device 102 can be integral with audience-sensing device 104 but be separate from state module 106, interest module 108, interface module 110, history module 216, advertisement module 220, or portion module 224. Further, each of these modules may operate on separate devices or be combined in one device.

As shown in FIG. 2, computing device(s) 202 can each be one or a combination of various devices, here illustrated with six examples: a laptop computer 202-1, a tablet computer 202-2, a smart phone 202-3, a set-top box 202-4, a desktop 202-5, and a gaming system 202-6, though other computing devices and systems, such as televisions with computing capabilities, netbooks, and cellular phones, may also be used. Note that three of these computing devices 202 include media presentation device 102 and audience-sensing device 104 (laptop computer 202-1, tablet computer 202-2, smart phone 202-3). One device excludes but is in communication with media presentation device 102 and audience-sensing device 104 (desktop 202-5). Two others exclude media presentation device 102 and may or may not include audience-sensing device 104, such as in cases where audience-sensing device 104 is included within media presentation device 102 (set-top box 202-4 and gaming system 202-6).

FIG. 3 is an illustration of an example remote computing device 302 that is remote to audience 114. FIG. 3 also illustrates a communications network 304 through which remote computing device 302 communicates with audience-sensing device 104 (not shown, but embodied within, or in communication with, computing device 202), interface module 110, history module 216 (including or excluding reaction history 218), advertisement module 220 (including or excluding advertisements 222), and portion module 224, assuming that these entities are in computing device 202 as illustrated in FIG. 2. Communication network 304 may be the Internet, a local-area network, a wide-area network, a wireless network, a USB hub, a computer bus, another mobile communications network, or a combination of these.

Remote computing device 302 includes one or more processors 306 and remote computer-readable storage media ("remote CRM") 308. Remote CRM 308 includes state module 106, interest module 108, media program(s) 210, each of which may include or have associated program information 212 and/or portions 214, history module 216, reaction history 218, advertisement module 220, advertisements 222, and portion module 224.

Note that in this illustrated example, media presentation device 102 and audience-sensing device 104 are physically separate from state module 106 and interest module 108, with the first two local to an audience viewing a media program and the second two operating remotely. Thus, sensor data is passed from audience-sensing device 104 to one or both of state module 106 or interest module 108, which can be communicated locally (FIG. 2) or remotely (FIG. 3). Further, after determination by state module 106 and/or interest module 108, various media reactions and other information can be communicated to the same or other computing devices 202 for receipt by interface module 110, history module 216, advertisement module 220, and/or portion module 224. Thus, in some cases a first of computing devices 202 may measure sensor data, communicate that sensor data to remote device 302, after which remote device 302 communicates media reactions to another of computing devices 202, all through network 304.

These and other capabilities, as well as ways in which entities of FIGS. 1-3 act and interact, are set forth in greater detail below. These entities may be further divided, combined, and so on. The environment 100 of FIG. 1 and the detailed illustrations of FIGS. 2 and 3 illustrate some of many possible environments capable of employing the described techniques.

Example Methods

Determining Media Reactions Based on Passive Sensor Data

Figure 4:
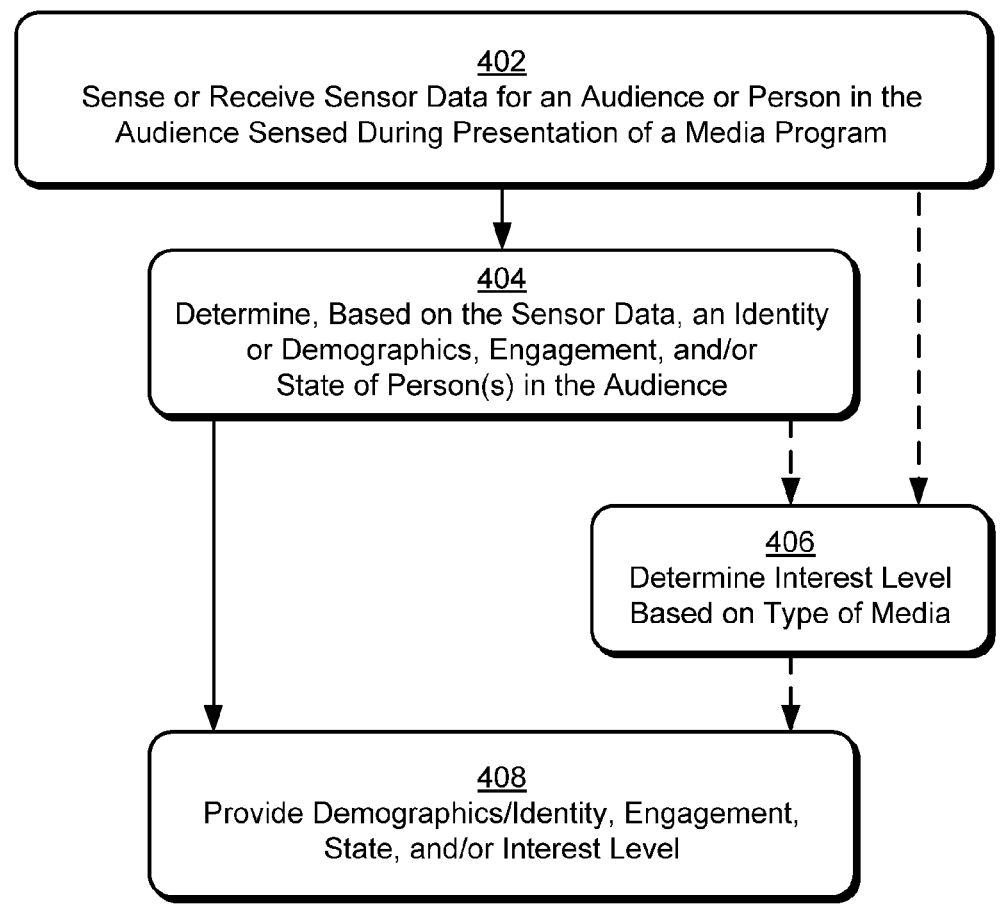
FIG. 4 illustrates example methods for determining media reactions based on passive sensor data.

FIG. 4 depicts methods 400 determines media reactions based on passive sensor data. These and other methods described herein are shown as sets of blocks that specify operations performed but are not necessarily limited to the order shown for performing the operations by the respective blocks. In portions of the following discussion reference may be made to environment 100 of FIG. 1 and entities detailed in FIGS. 2-3, reference to which is made for example only. The techniques are not limited to performance by one entity or multiple entities operating on one device.

Block 402 senses or receives sensor data for an audience or user, the sensor data passively sensed during presentation of a media program to the audience or user. This sensor data may include a context of the audience or user or a context may be received separately.

Consider, for example, a case where an audience includes three users 116, users 116-1, 116-2, and 116-3 all of FIG. 1. Assume that media presentation device 102 is an LCD display having speakers and through which the media program is rendered and that the display is in communication with set-top box 202-4 of FIG. 2. Here audience-sensing device 104 is a forward-facing high-resolution infrared sensor, a red-green-blue sensor, and two microphones capable of sensing sound and location (e.g., a directional array) that is integral with set-top box 202-4 or media presentation device 102. Assume also that the media program 210 being presented is a PG-rated animated movie named Incredible Family, which is streamed from a remote source and through set-top box 202-4. Set-top box 202-4 presents Incredible Family with six advertisements, spaced one at the beginning of the movie, three in a three-ad block, and two in a two-ad block.

Sensor data is received for all three users 116 in audience 114; for this example consider first user 116-1. Assume here that, over the course of Incredible Family, that audience-sensing device 104 measures, and then provides at block 402, the following at various times for user 116-1:

Time 1, head orientation 3 degrees, no or low-amplitude audio.
Time 2, head orientation 24 degrees, no audio.
Time 3, skeletal movement (arms), high-amplitude audio.
Time 4, skeletal movement (arms and body), high-amplitude audio.
Time 5, head movement, facial-feature change (20%), moderate-amplitude audio.
Time 6, detailed facial orientation data, no audio.
Time 7, skeletal orientation (missing), no audio.
Time 8, facial orientation, respiration rate.

Block 404 determines, based on the sensor data, a state of the user during the media program. In some cases block 404 determines a probability for the state or multiple probabilities for multiple states, respectively. For example, block 404 may determine a state likely to be correct but with less than full certainty (e.g., 40% chance that the user is laughing). Block 404 may also or instead determine that multiple states are possible based on the sensor data, such as a sad or placid state, and probabilities for each (e.g., sad state 65%, placid state 35%).

Block 404 may also or instead determine demographics, identity, and/or engagement. Further, methods 400 may skip block 404 and proceed directly to block 406, as described later below.

In the ongoing example, state module 106 receives the above-listed sensor data and determines the following corresponding states for user 116-1:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

At Time 1 state module 106 determines, based on the sensor data indicating a 3-degree deviation of user 116-1's head from looking directly at the LCD display and a rule indicating that the looking toward state applies for deviations of less than 20 degrees (by way of example only), that user 116-1's state is looking toward the media program. Similarly, at Time 2, state module 106 determines user 116-1 to be looking away due to the deviation being greater than 20 degrees.

At Time 3, state module 106 determines, based on sensor data indicating that user 116-1 has skeletal movement in his arms and audio that is high amplitude that user 116-1 is clapping. State module 106 may differentiate between clapping and other states, such as cheering, based on the type of arm movement (not indicated above for brevity). Similarly, at Time 4, state module 106 determines that user 116-1 is cheering due to arm movement and high-amplitude audio attributable to user 116-1.

At Time 5, state module 106 determines, based on sensor data indicating that user 116-1 has head movement, facial-feature changes of 20%, and moderate-amplitude audio, that user 116-1 is laughing. Various sensor data can be used to differentiate different states, such as screaming, based on the audio being moderate-amplitude rather than high-amplitude and the facial-feature changes, such as an opening of the mouth and a rising of both eyebrows.

For Time 6, audience-sensing device 104 processes raw sensor data to provide processed sensor data, and in this case facial recognition processing to provide detailed facial orientation data. In conjunction with no audio, state module 106 determines that the detailed facial orientation data (here upturned lip corners, amount of eyelids covering eyes) that user 116-1 is smiling.

At Time 7, state module 106 determines, based on sensor data indicating that user 116-1 has skeletal movement moving away from the audience-sensing device 104, that user 116-1 is departed. The sensor data may indicate this directly as well, such as in cases where audience-sensing device 104 does not sense user 116-1's presence, either through no skeletal or head readings or a thermal signature no longer being received.

At Time 8, state module 106 determines, based on sensor data indicating that user 116-1's facial orientation has not changed over a certain period (e.g., the user's eyes have not blinked) and a steady, slow respiration rate that user 116-1 is asleep.

These eight sensor readings are simplified examples for purpose of explanation. Sensor data may include extensive data as noted elsewhere herein. Further, sensor data may be received measuring an audience every fraction of a second, thereby providing detailed data for tens, hundreds, and thousands of periods during presentation of a media program and from which states or other media reactions may be determined.

Returning to methods 400, block 404 may determine demographics, identity, and engagement in addition to a user's state. State module 106 may determine or receive sensor data from which to determine demographics and identity or receive, from audience-sensing device 104, the demographics or identity. Continuing the ongoing example, the sensor data for user 116-1 may indicate that user 116-1 is John Brown, that user 116-2 is Lydia Brown, and that user 116-3 is Susan Brown. Or sensor data may indicate that user 116-1 is six feet, four inches tall and male (based on skeletal orientation), for example. The sensor data may be received with or include information indicating portions of the sensor data attributable separately to each user in the audience. In this present example, however, assume that audience-sensing device 104 provides three sets of sensor data, with each set indicating the identity of the user along with the sensor data.

Also at block 404, the techniques may determine an engagement of an audience or user in the audience. As noted, this determination can be less refined than that of states of a user, but nonetheless is useful. Assume for the above example, that sensor data is received for user 116-2 (Lydia Brown), and that this sensor data includes only head and skeletal orientation:

Time 1, head orientation 0 degrees, skeletal orientation upper torso forward of lower torso.
Time 2, head orientation 2 degrees, skeletal orientation upper torso forward of lower torso.
Time 3, head orientation 5 degrees, skeletal orientation upper torso approximately even with lower torso.

Time 4, head orientation 2 degrees, skeletal orientation upper torso back from lower torso.
Time 5, head orientation 16 degrees, skeletal orientation upper torso back from lower torso.
Time 6, head orientation 37 degrees, skeletal orientation upper torso back from lower torso.
Time 7, head orientation 5 degrees, skeletal orientation upper torso forward of lower torso.
Time 8, head orientation 1 degree, skeletal orientation upper torso forward of lower torso.

State module 106 receives this sensor data and determines the following corresponding engagement for Lydia Brown:
Time 1: Engagement High.
Time 2: Engagement High.
Time 3: Engagement Medium-High.
Time 4: Engagement Medium.
Time 5: Engagement Medium-Low.
Time 6: Engagement Low.
Time 7: Engagement High.
Time 8: Engagement High.

At Times 1, 2, 7, and 8, state module 106 determines, based on the sensor data indicating a 5-degree-or-less deviation of user 116-2's head from looking directly at the LCD display and skeletal orientation of upper torso forward of lower torso (indicating that Lydia is leaning forward to the media presentation) that Lydia is highly engaged in Incredible Family at these times.

At Time 3, state module 106 determines that Lydia's engagement level has fallen due to Lydia no longer leaning forward. At Time 4, state module 106 determines that Lydia's engagement has fallen further to medium based on Lydia leaning back, even though she is still looking almost directly at Incredible Family.

At Times 5 and 6, state module 106 determines Lydia is less engaged, falling to Medium-Low and then Low engagement based on Lydia still leaning back and looking slightly away (16 degrees) and then significantly away (37 degrees), respectively. Note that at Time 7 Lydia quickly returns to a High engagement, which media creators are likely interested in, as it indicates content found to be exciting or otherwise captivating.

Methods 400 may proceed directly from block 402 to block 406, or from block 404 to block 406 or block 408. If proceeding to block 406 from block 404, the techniques determine an interest level based on the type of media being presented and the user's engagement or state. If proceeding to block 406 from block 402, the techniques determine an interest level based on the type of media being presented and the user's sensor data, without necessarily first or independently determining the user's engagement or state.

Continuing the above examples for users 116-1 and 116-2, assume that block 406 receives states determined by state module 106 at block 404 for user 116-1 (John Brown). Based on the states for John Brown and information about the media program, interest module 108 determines an interest level, either overall or over time, for Incredible Family. Assume here that Incredible Family is both an adventure and a comedy program, with portions of the movie marked as having one of these media types. While simplified, assume that Times 1 and 2 are marked as comedy, Times 3 and 4 are marked as adventure, Times 5 and 6 are marked as comedy, and that Times 7 and 8 are marked as adventure. Revisiting the states determined by state module 106, consider the following again:
Time 1: Looking toward.
Time 2: Looking away.
Time 3: Clapping.
Time 4: Cheering.
Time 5: Laughing.
Time 6: Smiling.
Time 7: Departed.
Time 8: Asleep.

Based on these states, state module 106 determines for Time 1 that John Brown has a medium-low interest in the content at Time 1—if this were of an adventure or drama type, state module 106 may determine John Brown to instead be highly interested. Here, however, due to the content being comedy and thus intended to elicit laughter or a similar state, interest module 108 determines that John Brown has a medium-low interest at Time 1. Similarly, for Time 2, interest module 108 determines that John Brown has a low interest at Time 2 because his state is not only not laughing or smiling but is looking away.

At Times 3 and 4, interest module 108 determines, based on the adventure type for these times and states of clapping and cheering, that John Brown has a high interest level. At time 6, based on the comedy type and John Brown smiling, that he has a medium interest at this time.

At Times 7 and 8, interest module 108 determines that John Brown has a very low interest. Here the media type is adventure, though in this case interest module 108 would determine John Brown's interest level to be very low for most types of content.

As can be readily seen, advertisers, media providers, and media creators can benefit from knowing a user's engagement or interest level. Here assume that the interest level is provided over time for Incredible Family, along with demographic information about John Brown. With this information from numerous demographically similar users, a media creator may learn that male adults are interested in some of the adventure content but that most of the comedy portions are not interesting, at least for this demographic group.

Figure 5:
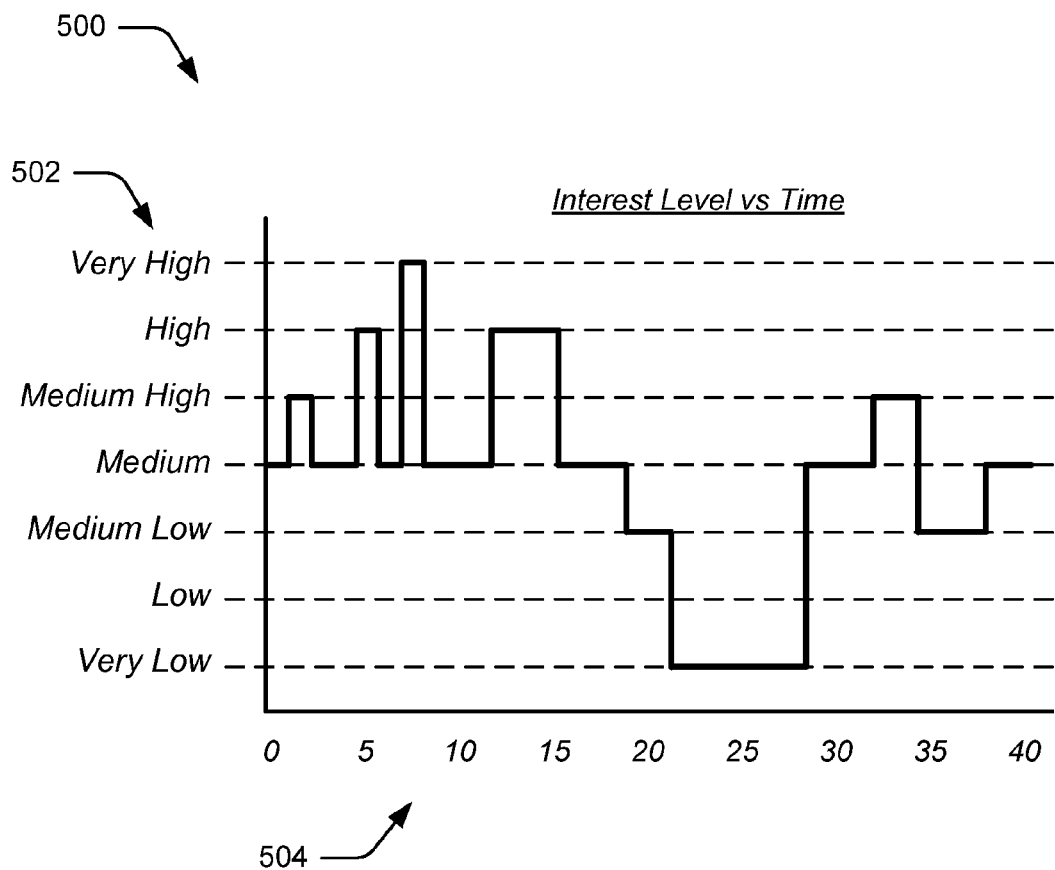
FIG. 5 illustrates a time-based graph of media reactions, the media reactions being interest levels for one user and for forty time periods during presentation of a media program.

Consider, by way of a more-detailed example, FIG. 5, which illustrates a time-based graph 500 having interest levels 502 for forty time periods 504 over a portion of a media program. Here assume that the media program is a movie that includes other media programs—advertisements—at time periods 18 to 30. Interest module 108 determines, as shown, that the user begins with a medium interest level, and then bounces between medium and medium-high, high, and very high interest levels to time period 18. During the first advertisement, which covers time periods 18 to 22, interest module 108 determines that the user has a medium low interest level. For time periods 23 to 28, however, interest module 108 determines that the user has a very low interest level (because he is looking away and talking or left the room, for example). For the last advertisement, which covers time period 28 to 32, however, interest module 108 determines that the user has a medium interest level for time periods 29 to 32—most of the advertisement.

This can be valuable information—the user stayed for the first advertisement, left for the middle advertisement and the beginning of the last advertisement, and returned, with medium interest, for most of the last advertisement. Contrast this resolution and accuracy of interest with some conventional approaches, which likely would provide no information about how many of the people that watched the movie actually watched the advertisements, which ones, and with what amount of interest. If this example is a common trend with the viewing public, prices for advertisements in the middle of a block would go down, and other advertisement prices would be adjusted as well. Or, advertisers and media providers might learn to play shorter advertisement blocks having only two advertisements, for example. Interest levels 502 also provide valuable information about portions of the movie itself, such as through the very high interest level at time period 7 (e.g., a particularly captivating scene of a movie) and the waning interest at time periods 35-38.

Note that, in some cases, engagement levels, while useful, may be less useful or accurate than states and interest levels. For example, state module 106 may determine, for just engagement levels, that a user is not engaged if the user's face is occluded (blocked) and thus not looking at the media program. If the user's face is blocked by that user's hands (skeletal orientation) and audio indicates high-volume audio, state module 106, when determining states, may determine the user to be screaming. A screaming state indicates, in conjunction with the content being horror or suspense, an interest level that is very high. This is but one example of where an interest level can be markedly different from that of an engagement level.

As noted above, methods 400 may proceed directly from block 402 to block 406. In such a case, interest module 108, either alone or in conjunction with state module 106, determines an interest level based on the type of media (including multiple media types for different portions of a media program) and the sensor data. By way of example, interest module 108 may determine that for sensor data for John Brown at Time 4, which indicates skeletal movement (arms and body), and high-amplitude audio, and a comedy, athletics, conflict-based talk show, adventure-based video game, tweet, or horror types, that John Brown has a high interest level at Time 4. Conversely, interest module 108 may determine that for the same sensor data at Time 4 for a drama, melodrama, or classical music, that John Brown has a low interest level at Time 4. This can be performed based on the sensor data without first determining an engagement level or state, though this may also be performed.

Block 408, either after block 404 or 406, provides the demographics, identity, engagement, state, and/or interest level. State module 106 or interest module 108 may provide this information to various entities, such as interface module 110, history module 216, advertisement module 220, and/or portion module 224, as well as others.

Providing this information to an advertiser after presentation of an advertisement in which a media reaction is determined can be effective to enable the advertiser to measure a value of their advertisements shown during a media program. Providing this information to a media creator can be effective to enable the media creator to assess a potential value of a similar media program or portion thereof. For example, a media creator, prior to releasing the media program to the general public, may determine portions of the media program that are not well received, and thus alter the media program to improve it.

Providing this information to a rating entity can be effective to enable the rating entity to automatically rate the media program for the user. Still other entities, such as a media controller, may use the information to improve media control and presentation. A local controller may pause the media program responsive to all of the users in the audience departing the room, for example.

Providing media reactions to history module 216 can be effective to enable history module 216 to build and update reaction history 218. History module 216 may build reaction history 218 based on a context or contexts in which each set of media reactions to a media program are received, or the media reactions may, in whole or in part, factor in a context into the media reactions. Thus, a context for a media reaction where the user is watching a television show on a Wednesday night after work may be altered to reflect that the user may be tired from work.

As noted herein, the techniques can determine numerous states for a user over the course of most media programs, even for 15-second advertisements or video snippets. In such a case block 404 is repeated, such as at one-second periods.

Furthermore, state module 106 may determine not only multiple states for a user over time, but also various different states at a particular time. A user may be both laughing and looking away, for example, both of which are states that may be determined and provided or used to determine the user's interest level.

Further still, either or both of state module 106 and interest module 108 may determine engagement, states, and/or interest levels based on historical data in addition to sensor data or media type. In one case a user's historical sensor data is used to normalize the user's engagement, states, or interest levels (e.g., dynamically for a current media reaction). If, for example, Susan Brown is viewing a media program and sensor data for her is received, the techniques may normalize or otherwise learn how best to determine engagement, states, and interest levels for her based on her historical sensor data. If Susan Brown's historical sensor data indicates that she is not a particularly expressive or vocal user, the techniques may adjust for this history. Thus, lower-amplitude audio may be sufficient to determine that Susan Brown laughed compared to higher-amplitude audio generally used to determine that a user laughed.

In another case, historical engagement, states, or interest levels of the user for which sensor data is received are compared with historical engagement, states, or interest levels for other people. Thus, a lower interest level may be determined for Lydia Brown based on data indicating that she exhibits a high interest for almost every media program she watches compared to other people's interest levels (either generally or for the same media program). In either of these cases the techniques learn over time, and thereby can normalize engagement, states, and/or interest levels.

Methods for Building a Reaction History

As noted above, the techniques may determine a user's engagement, state, and/or interest level for various media programs. Further, these techniques may do so using passive or active sensor data. With these media reactions, the techniques may build a reaction history for a user. This reaction history can be used in various manners as set forth elsewhere herein.

Figure 6:
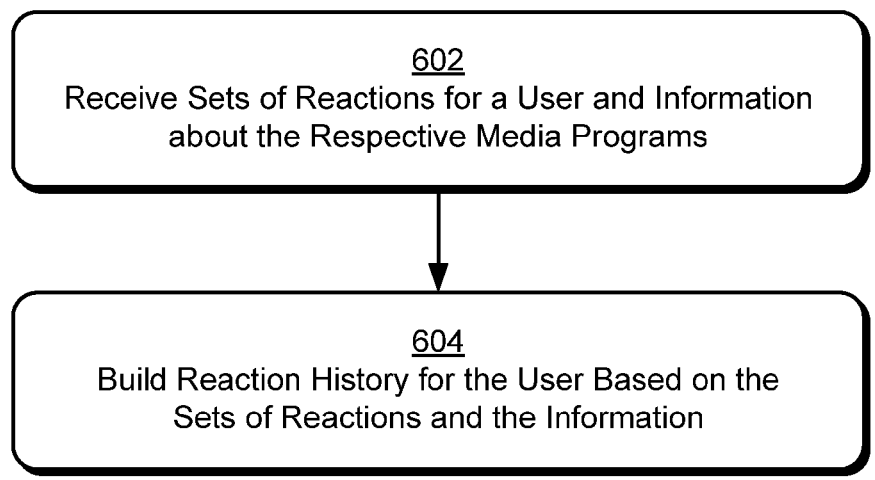
FIG. 6 illustrates example methods for building a reaction history.

FIG. 6 depicts methods 600 for building a reaction history based on a user's reactions to media programs. Block 602 receives sets of reactions of a user, the sets of reactions sensed during presentation of multiple respective media programs, and information about the respective media programs. An example set of reactions to a media program is illustrated in FIG. 5, those shown being a measure of interest level over the time in which the program was presented to the user.

The information about the respective media programs can include, for example, the name of the media (e.g., The Office, Episode 104) and its type (e.g., a song, a television show, or an advertisement) as well as other information set forth herein.

In addition to the media reactions and their respective media programs, block 602 may receive a context for the user during which the media program was presented as noted above.

Further still, block 602 may receive media reactions from other users with which to build the reaction history. Thus, history module 216 may determine, based on the user's media reactions (either in part or after building an initial or preliminary reaction history for the user) other users having similar reactions to those of the user. History module 216 may determine other persons that have similar reactions to those of the user and use those other persons' reactions to programs that the user has not yet seen or heard to refine a reaction history for the user.

Block 604 builds a reaction history for the user based on sets of reactions for the user and information about the respective media programs. As noted, block 604 may also build the user's reaction history using other persons' reaction histories, contexts, and so forth. This reaction history can be used elsewhere herein to determine programs likely to be enjoyed by the user, advertisements likely to be effective when shown to the user, and for other purposes noted herein.

Methods for Presenting Advertisements Based on a Current Media Reaction

As noted above, the techniques may determine a user's current media reaction, such as an engagement, state, and/or interest level. The following methods address how a current media reaction can be used to determine an advertisement to present.

Figure 7:
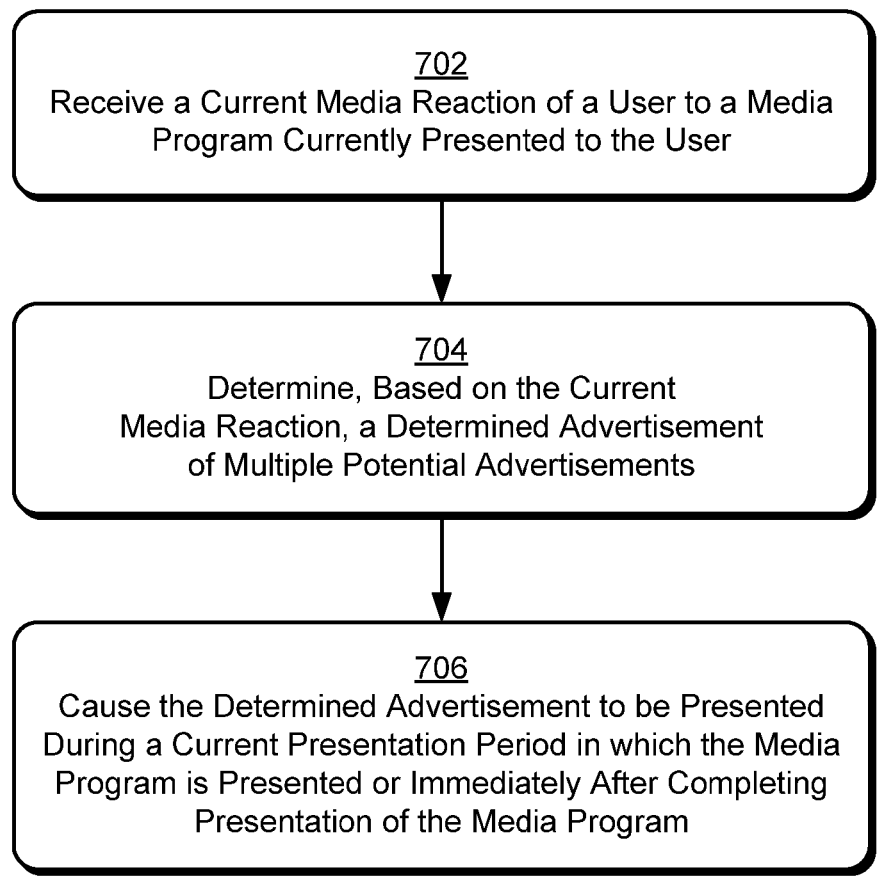
FIG. 7 illustrates example methods for presenting an advertisement based on a current media reaction, including by determining which advertisement of multiple potential advertisements to present.

FIG. 7 depicts methods 700 for presenting an advertisement based on a current media reaction, including by determining which advertisement of multiple potential advertisements to present.

Block 702 receives a current media reaction of a user to a media program, the media program currently presented to the user. The current media reaction can be of various kinds and in various media, such as a laugh to a scene of a comedy, a cheer to a sports play of a live sporting game, dancing to a song or music video, being distracted during a drama, intently watching a commercial for a movie, or talking to another person in the room also watching a news program, to name just a few. The media program is one that is currently being presented to a user, such as user 116-1 of FIG. 1, rather than an historic media reaction, though a reaction history or other current media reactions made earlier during the same media program may be used in addition to a newest, current media reaction.

Figure 8:
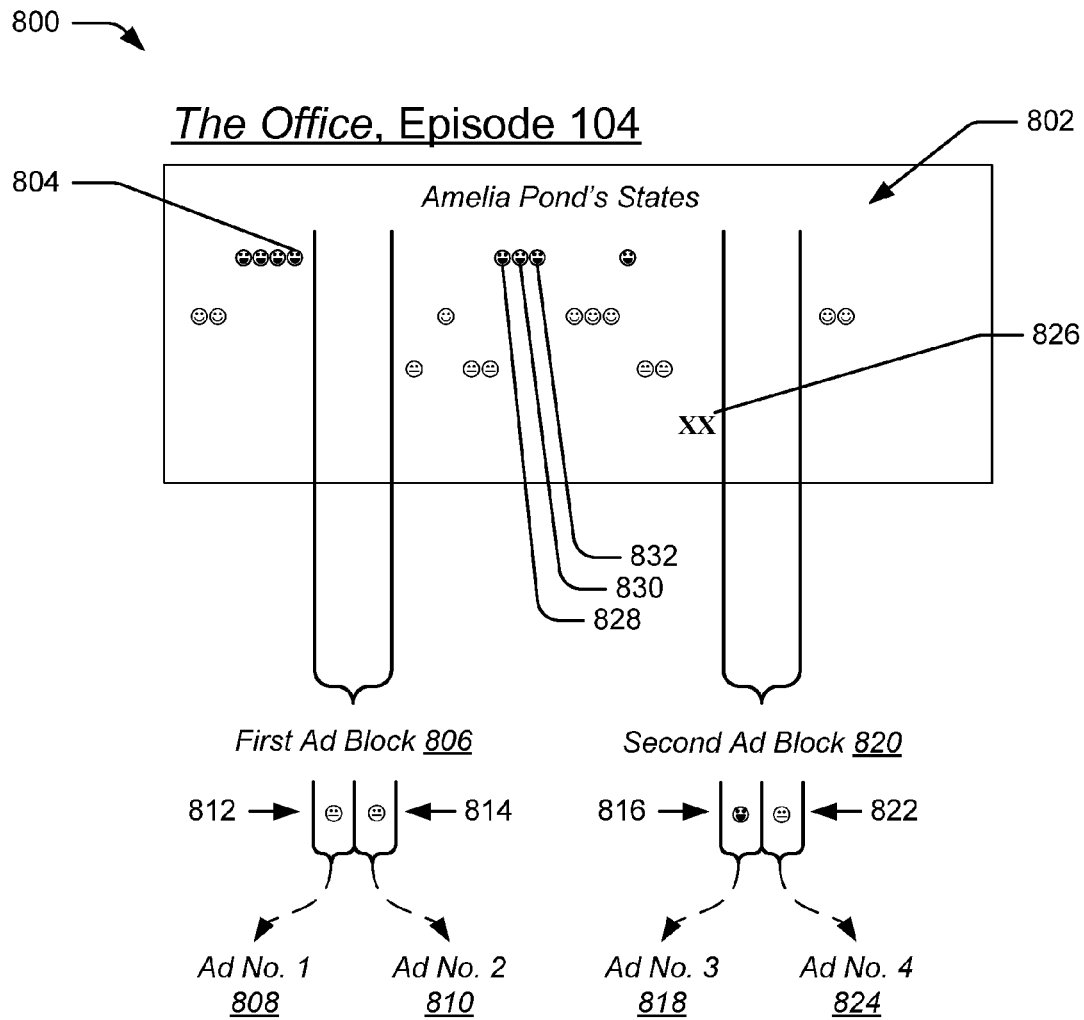
FIG. 8 illustrates current media reactions to a media program over a portion of the program as the program is being presented.

By way of example, consider FIG. 8, which illustrates current media reactions to a comedy program (The Office, Episode 104) over a portion of the program as the program is being presented, shown at time-based state graph 800. Here 23 media reactions 802 are shown, the media reactions being states received by advertisement module 220 from state module 106 and for a user named Amelia Pond. For visual brevity, time-based state graph 800 shows only four states, laughing (shown with ""), smiling (shown with ""), interested (shown with ""), and departed (shown with "X").

Block 704 determines, based on the current media reaction to the media program, a determined advertisement of multiple potential advertisements. Block 704 may determine which advertisement to show and when based on the current media reaction as well as other information, such as a reaction history for the user (e.g., reaction history 218 of FIG. 2 for Amelia Pond), a context for the current media reaction (e.g., Amelia Pond's location is sunny or she just got home from school), demographics of the user (e.g., Amelia Pond is a 16-year-old female that speaks English and lives in Seattle, Wash., USA), the type of media program (e.g., a comedy), or a media reaction of another user also in the audience (e.g., Amelia Pond's brother Calvin Pond reacted in a certain way). Block 704 may determine which advertisement to show immediately following the current media reaction, such as to a last scene shown in the program before an advertisement is shown, though instead block 704 may also use current media reactions that are not immediately before the advertisement or use multiple current media reactions, such as the last six media reactions, and so forth.

Continuing the ongoing embodiment, assume that the current media reaction is reaction 804 of FIG. 8 in which Amelia Pond is laughing at a current scene of the show The Office. Assume also that at the end of the scene, which ends in 15 seconds, a first ad block 806 begins. This first ad block 806 is one-minute long and is scheduled to include two 30-second advertisements, one for ad no. 1 808 and another for ad no. 2 810.

Assume also for this case that a first advertiser has previously purchased the right to ad no. 1 808 and for this spot has previously provided three different potential advertisements one of which will be played based on the current media reaction. Thus, advertisement module 220 first ascertains that there are three potential advertisements in advertisements 222 both of FIG. 2 or 3, and which is appropriate. Here the advertiser was aware, in advance, that the program was The Office and that it is Episode 104. Assume that this program is being watched for the first time, and thus other media reactions of other users have not been recorded for the whole program. Based on information about the program generally, however, one advertisement is indicated as appropriate to play if the current media reaction is laughing or smiling, one if the reaction departed, and another is for all other states. Assume that the advertiser is a large car manufacturer, and that the first advertisement (for laughing or smiling) is for a fun, quick sports car, that the second, because it will play if the user has departed the room, is repetitive and audio-focused, stating the virtues of the manufacturer (e.g., Desoto cars are fast, Desoto cars are fun, Desoto cars are a good value) in the hopes that the user is within hearing distance of the advertisement, and the third is for a popular and sensible family car.

Note that this is a relatively simple case using a current media reaction and based in part on the type or general information about the program. An advertiser may instead provide 20 advertisements for many current media reactions as well as demographics about a user and a user's reaction history. Thus, advertisement module 220 may determine that five of the 20 advertisements are potentially appropriate based on the user being a male between 34 and 50 years of age and thus excluding various cars sold by the manufacturer that are generally not good sellers for men of this age group. Advertisement module 220 may also determine that two of the five are more appropriate based on the user's reaction history indicating that he has positively reacted to fishing shows and auto-racing shows and therefore showing trucks and sport utility vehicles. Finally, advertisement module 220 may determine which of these two to present based on the user's current media reaction indicating that the user was highly engaged with the program and thus showing an advertisement for trucks that goes into detail about the trucks in the assumption that the user is paying sufficient attention to appreciate those details rather than a less-detailed, more-stylistic advertisement.

Block 706 causes the determined advertisement to be presented during a current presentation period in which the media program is presented or immediately after completing presentation of the media program. Block 706 may cause the determined advertisement to be presented by presenting the advertisement or by indicating to a presentation entity, such as media presentation device 102 of FIG. 2, that the determined advertisement should be presented. The current presentation period is an amount of time sufficient to present the media program but may also include an amount of time sufficient to present a previously determined number of advertisements or amount of time to present advertisements.

Concluding the ongoing embodiment concerning Amelia Pond, consider again FIG. 8. Here advertisement module 220 caused media presentation device 102 of FIG. 2 to present the first advertisement for a fun, quick sports car based on Amelia's current media reaction being a laugh.

Advertisement module 220 may base its determination on media reactions other than a most-recent media reaction, whether these reactions are current to the media program or the current presentation period for the media program or for other programs, such as those on which a user's reaction history is based. Current media reactions may also be those that are received for reactions during the current presentation period but not for the program. Thus, a user's reaction to a prior advertisement shown in advertisement blocks within the current presentation period may also be used to determine which advertisement to present.

Methods 700 may be repeated, and thus ad no. 2 810 may be selected at least in part based on the "interested state" shown at advertisement reaction 812. Thus, methods 700 can be repeated for various advertisements and current reactions during the current presentation period, whether the reactions are to a program or an advertisement.

Other advertisement reactions are also shown, a second advertisement reaction 814, a third advertisement reaction 816 for ad no. 3 818 of second ad block 820, and a fourth advertisement reaction 822 for ad no. 4 824. Note that the third advertisement determined to be presented by advertisement module 220 is based in part on a departed state 826 and that the third advertisement determined to be presented in based on the user laughing at the third advertisement. These are but a few of the many examples in which current media reactions can be used by the techniques to determine an advertisement to present.

Optionally, the techniques can determine pricing for an advertisement based on a current media reaction to a media program. Thus, an advertisement may cost less if the user is currently departed or more if the user is currently laughing or otherwise engaged. The techniques, then, are capable of setting prices for advertisements based on media reactions, including independent of an advertiser's bid to present an advertisement. In such a case the techniques may present advertisements based on which advertiser agrees or has agreed to the price, as opposed to a highest bid structure, or some combination of bids and determined pricing. One example of a combination of bids and determined pricing is an opening price set by the techniques based on media reactions, and then bids from advertisers bidding based on the opening price.

Also optionally, the techniques may enable users to explicitly interact with an advertisement. An advertisement may include an explicit request for a requested media reaction to facilitate an offer, for example. Thus, the detailed truck advertisement may include text or audio asking a user to raise his or her hand for a detailed sales brochure to be sent to the user's email or home address, or an advertisement for a delivery pizza chain of stores may ask a user to cheer for ½ off a home delivery pizza for delivery during a currently-playing football game. If the user raises his or her hand, the techniques pass this state to the associated advertiser, which may then send back a phone number to display within the advertisement for the user's local store along with a code for ½ off the pizza.

Figure 9:
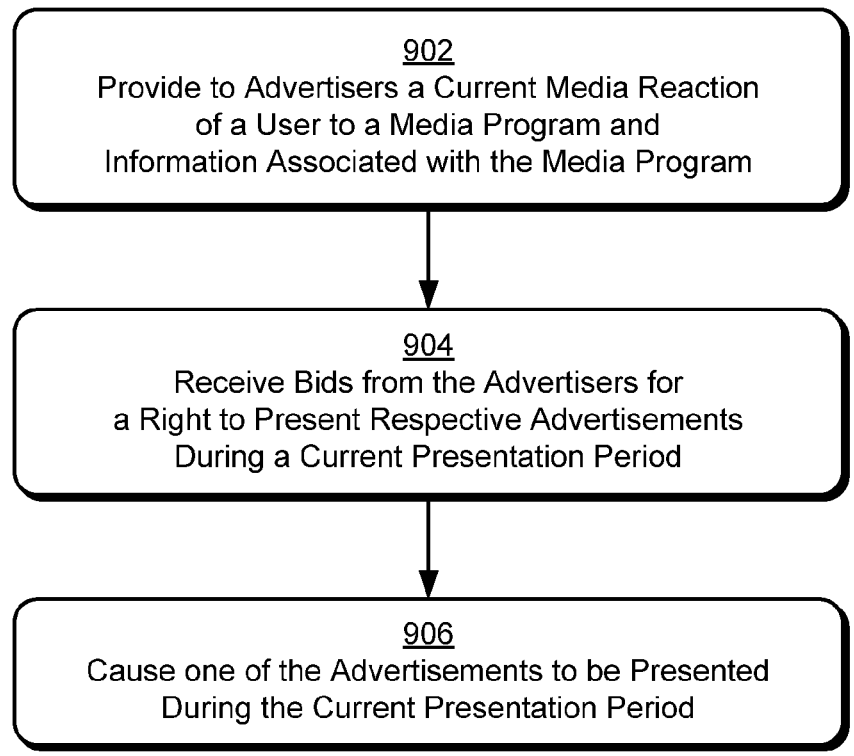
FIG. 9 illustrates example methods for presenting an advertisement based on a current media reaction, including based on bids from advertisers.

FIG. 9 depicts methods 900 for presenting an advertisement based on a current media reaction, including based on bids from advertisers.

Block 902 provides to advertisers a current media reaction of a user to a media program currently presented to the user. Block 902 may provide the current media reaction as received or determined in various manners described above, such as with state module 106, interest module 108, and/or advertisement module 220. Block 902 may also provide other information, such as a reaction history or portions thereof for the user, demographic information about the user, a context in which the user is presented the media program, or information about the media program.

Figure 10:
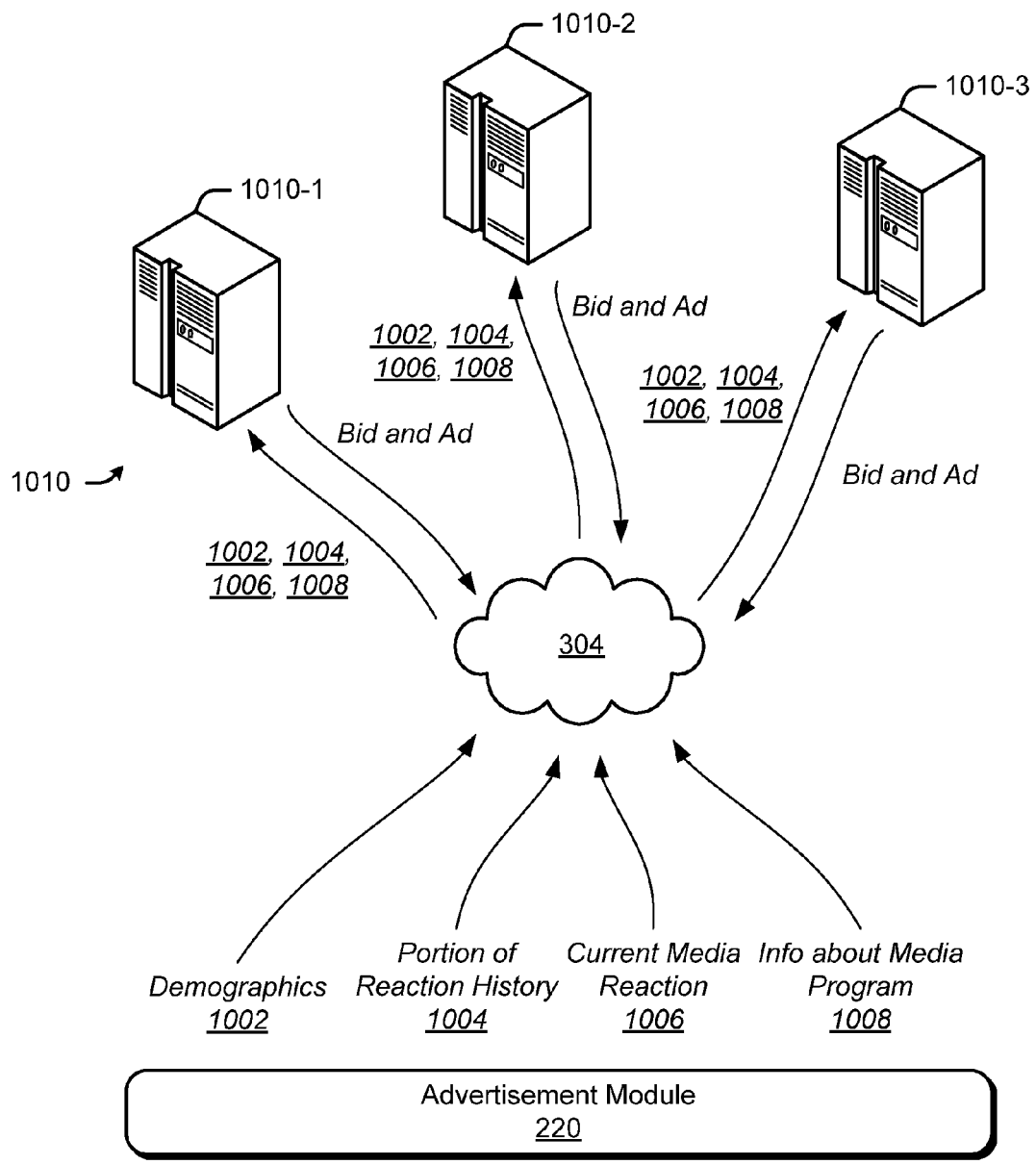
FIG. 10 illustrates the advertisement module of FIGS. 2 and 3 passing information through the communications network of FIG. 3 to multiple advertisers.

Consider, for example, FIG. 10, which illustrates advertisement module 220 providing, through communication network 304, demographics 1002, a portion of reaction history 1004, a current media reaction 1006, and information about the media program 1008 to advertisers 1010 (shown including first, second, and third advertisers 1010-1, 1010-2, and 1010-3, respectively).

Assume here that demographics 1002 indicate that the user is a 33-year-old female that is married with one child. Assume also that the portion of reaction history 1004 indicates the user's identity, namely Melody Pond, and her preference for science fiction programs, the Olympic Games, and prior positive reactions to advertisements for movie trailers, shoe sales, and triathlons. Here assume that current media reaction 1006 indicates disappointment (a sad state) and that information about media program 1008 indicates that the program is a swim meet in which the last section at which the current media reaction was a sad state showed Michael Phelps placing second in an international swim meet to Australian swimmer Ian Thorp.

Block 904 receives bids from the advertisers, the bids for a right to present a respective advertisement to the user and during a current presentation period in which the media program is presented. This right may be to present an advertisement immediately, such as right after the scene or section for the current media reaction completes and prior to another advertisement being shown. This right may instead by for a later portion of the current presentation period, such as a second advertisement after the scene or an advertisement in a block five minutes later, for example.

Consider the above example where the user has a sad state just prior to an advertisement being shown. Some advertisers will not be as interested in presenting advertisements to a user having this state, and so bid lower for the right to show their advertisement, while others consider their advertisements more effective to persons having a sad state. Further, the advertisers likely take into account, and assign value, based also on the user's demographics, reaction history, and which program they are watching. An advertiser selling life insurance or investment plans is more likely to bid high for a right to show directly after a sad state and for a person that has young children, for example, than an advertiser selling carpet-cleaning products.

For this example assume that all three advertisers 1010 bid on the right to show advertisements and include, with each bid, information sufficient for advertisement module 220 to cause the advertisement to be presented, such as with an indicator for an advertisement of advertisements 222 or a universal resource locator at which to retrieve the advertisement.

Block 906 causes one of the advertisements associated with one of the bids to be presented to the user during the current presentation period in which the media program is presented. Block 906 may select to show the advertisement responsive to determining which bid is highest, though a highest bid is not necessarily required. Concluding the example, advertisement module 220 causes the advertisement associated with the highest bid to be presented to the user.

In addition to the manners set forth above, the techniques may provide a number of additional users present during the presentation of the media program, including in some cases their current media reaction and so forth, thereby likely increasing the size of the bids.

Further, advertisement module 220 may receive a media reaction to the advertisement shown and, based on the reaction, reduce or increase the cost for the advertisement relative to the bid made for that advertisement.

Methods 900 may be repeated, in whole or in part, for later advertisements, including based on current media reactions to prior advertisements, similarly to as described in examples of methods 700.

FIG. 11 depicts methods 1100 for presenting an advertisement based on a current media reaction, including immediately following a scene in which the current media reaction was made.

Block 1102 determines, based on a current media reaction to a scene of a media program being presented to a user, a type of the media program, and a reaction history associated with the user, a determined advertisement of multiple potential advertisements. Manners in which this may be performed are set forth above. Note that an advertiser may place a bid or prepay based on their advertisement being presented after a certain type of reaction, such as five cents for each ad placement directly after a laughing reaction. Furthermore, if ads are not placed for each user but instead are placed generally or by groups (e.g., to people within a certain geographic area), the bids or prepay may instead be weighted based on percentages of positive reactions and so forth.

Block 1104 causes the determined advertisement to be presented immediately after completing presentation of the scene of the media program.

Methods for Determining a Future Portion of a Currently Presented Media Program

As noted above, the techniques may determine a user's current media reaction, such as an engagement, state, and/or interest level. The following methods address how a current media reaction can be used to determine a future portion to present during the currently presented media program.

Figure 12:
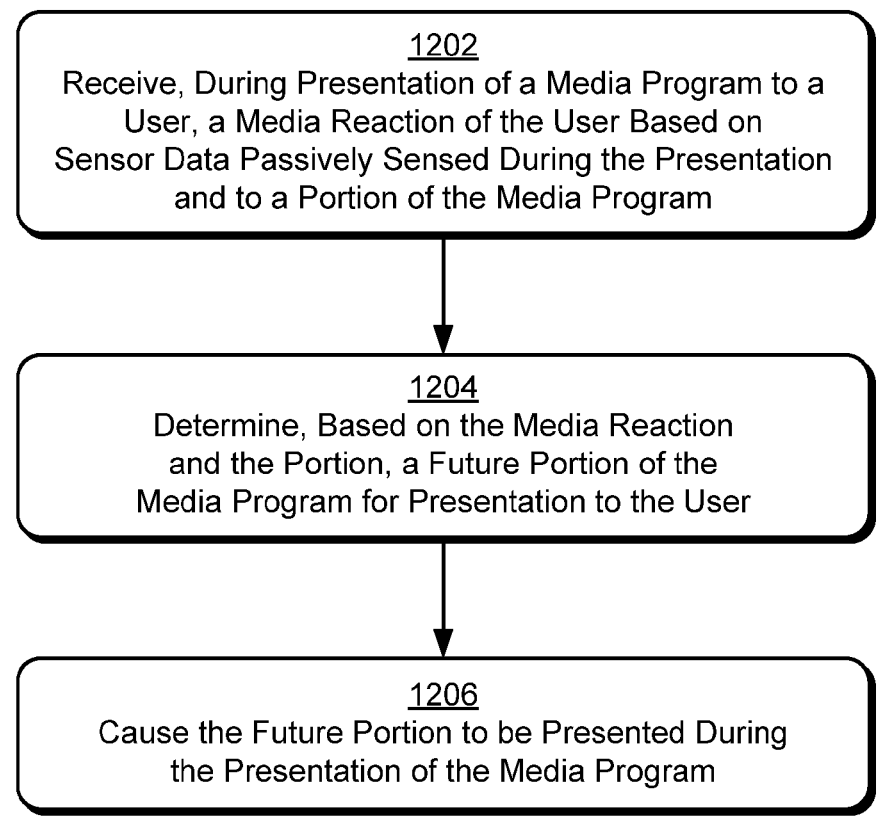
FIG. 12 illustrates methods for determining a future portion of a currently presented media program, including based on a current media reaction of a user determined based on sensor data passively sensed during the presentation of the media program to the user.

FIG. 12 depicts methods 1200 for determining a future portion of a currently presented media program, including based on a current media reaction of a user determined based on sensor data passively sensed during the presentation of the media program to the user.

Block 1202 receives, during presentation of a media program to a user, a current media reaction of the user to a portion of the media program, the media reaction determined based on sensor data passively sensed during the presentation.

As noted in detail elsewhere herein, the current media reaction can be of various kinds and responsive to various media, such as a laugh to a scene of a comedy, a cheer to a sports play of a live sporting game, dancing to a song or music video, being distracted during a drama, intently watching a commercial for a movie, or talking to another person in the room also watching a news program, to name just a few. The media program is one that is currently being presented to a user, such as user 116-1 of FIG. 1, rather than a media program previously presented, and thus the reaction being an historic media reaction. A reaction history based on historic media reactions may be used in conjunction with a current media reaction, however, to determine future portions. Also, other current media reactions made earlier during the same media program may be used also or instead of a most-current media reaction.

A media reaction is current by being received during a current presentation of the media program but does not have to be received immediately or instantaneously, or even be a most-current media reaction to the media program. Thus, a current media reaction to a fourth portion of a media program may be received during a sixth portion and used to determine a fifteenth portion to present in the media program.

Figure 13:
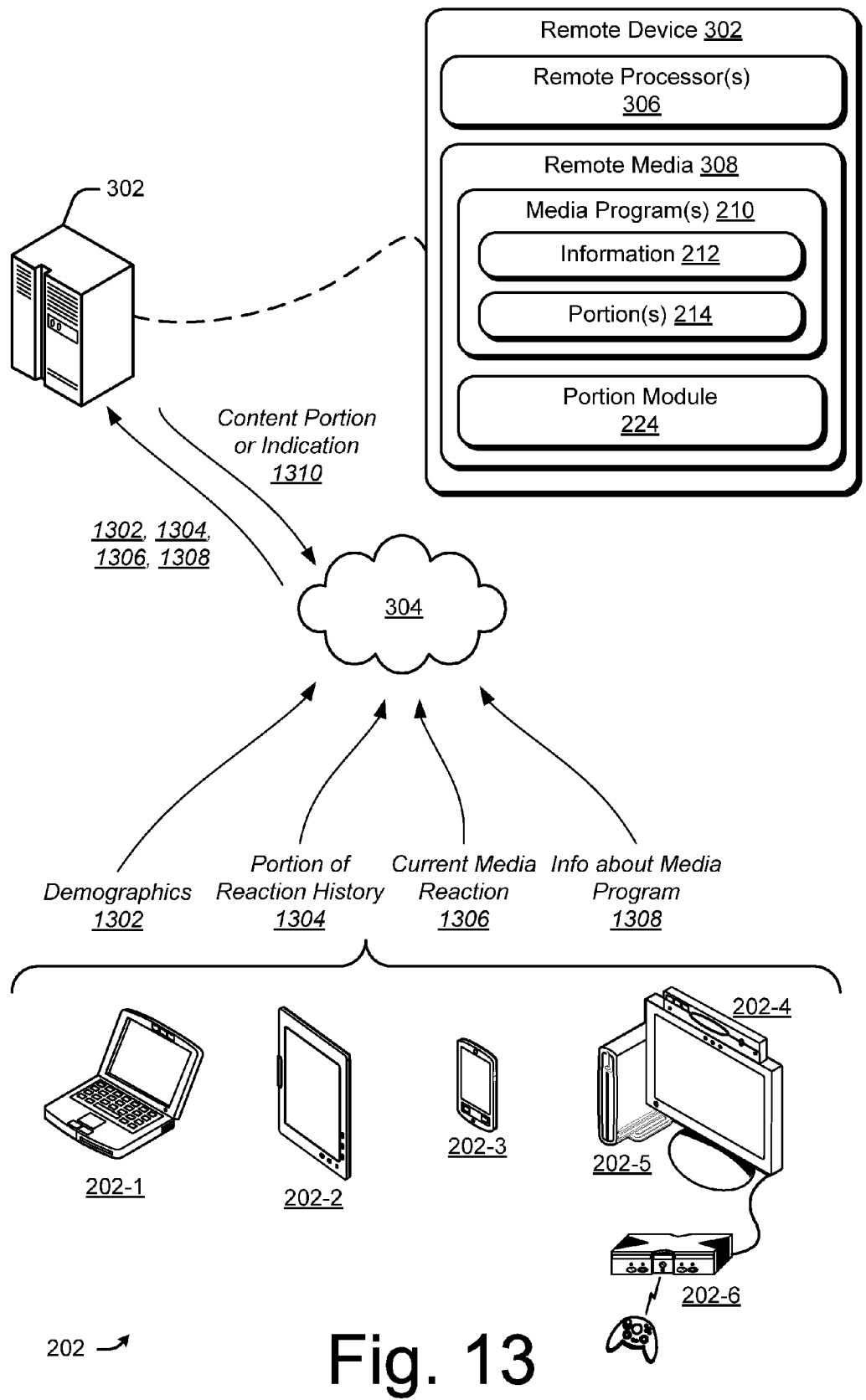
FIG. 13 illustrates the remote device of FIG. 3 in which demographics, a portion of a reaction history, a current media reaction, and information about the media program is received from the computing device of FIGS. 2 and/or 3.

By way of example consider FIG. 13 which illustrates remote device 302, on which portion module 224 is embodied, receiving demographics 1302, a portion of a reaction history 1304, a current media reaction 1306, and information about the media program 1308 from computing device 202 of FIG. 2. Portion module 224 receives this data through communication network 304 and, in response, causes computing device 202 to present a particular, future potion of the media program to the user associated with this data.

Also by way of example, consider FIG. 8, which illustrates current media reactions to a comedy program (The Office, Episode 104) over a portion of the program as the program is being presented, shown at time-based state graph 800. While 23 media reactions 802 are shown for 23 portions in FIG. 8, for this example consider media reactions 828, 830, and 832, which represent smiling states at the $14^{th}$, $15^{th}$, and $16^{th}$ portions. Here assume that these are three current media reactions (with media reaction 832 being the most current), and that the $17^{th}$ through $23^{rd}$ portions have not yet been presented. Assume also that demographics 1302 indicate that the person watching The Office is a 23-year old female, that the portion of reaction history 1304 indicates that the person usually dislikes comedies but likes science fiction movies and dramas, that the current media reactions 1306 includes the three smiling states noted above, and the information about the media program 1308 indicates that the program is The Office, Episode 104, and that the current media reactions are to the $14^{th}$, $15^{th}$, and $16^{th}$ portions.

Block 1204 determines, based on the media reaction and the portion, a future portion of the media program for presentation to the user, the future portion of the media program occurring later in the media program than the portion. In making this determination, portion module 224 may receive sufficient information or may use that information to gain additional information. Thus, assume that the information about the media program 1308 indicates the three portions, and that portion module 224 determines that these portions address a scene that develops the Pam character in the show but is not otherwise a joke or intended to be comedic. Based on the person's reaction (smiling) and the subject matter of these portions (character development of Pam) portion module 224 may decide between various possible scenes to show at the end of the program, for example. Portion module 224 may base this determination on other information as well, as noted in FIG. 13. Thus, portion module 224 may determine that a 23-year old female that dislikes comedies generally but that smiles throughout a scene about Pam will enjoy another character-development scene more than a scene having physical humor where a character named Dwight falls off of a paper truck. Here portions 214 include two possible future portions to show at the end of The Office here at the 23$^{rd}$ portion, one about the character falling off the truck and one about Pam.

Block 1206 causes the future portion of the media program to be presented to the user during the current presentation of the media program. Portion module 224 may act locally or remotely and may indicate or provide the portion to present. Thus, portion module 224 may cause the presentation of the future portion through passing a content portion or indication 1310 through communication network 304 to computing device 202. Portion module 224, if receiving an indication, may select from various previously-stored portions stored local to (or accessible by) computing device 202 and based on the indication.

Concluding the ongoing example, assume that remote device 302 of FIG. 13 is streaming the media program through set-top box 202-4 and thus, at the 23$^{rd}$ portion, streams the scene about Pam rather than the scene about Dwight.

While the above example for methods 1200 concerns a single user, media reactions of other users may also be used, including other persons physically local to the user (e.g., in a same room watching with the 23-year-old female user). Further still, media reactions of other users not watching with the user, such as other members of a same demographic group (e.g., women aged 18-34) or an audience generally (e.g., everyone watching for which media reactions are received during a first showing in the Eastern Standard Time block of the United States and Canada) may be used.

Note that the media reactions of this user and other users can be received and used in real-time to determine future portions of a currently presented media program. Thus, a program may be tailored to people on-the-fly and in real time, thereby improving the quality of the program. In this example the media program is tailored based on previously prepared portions, though this is not required. A live program may be altered in real time as well, such as a live, late-night comedy show selecting to perform a skit based on good reactions of a prior skit presented earlier in the program.

Figure 14:
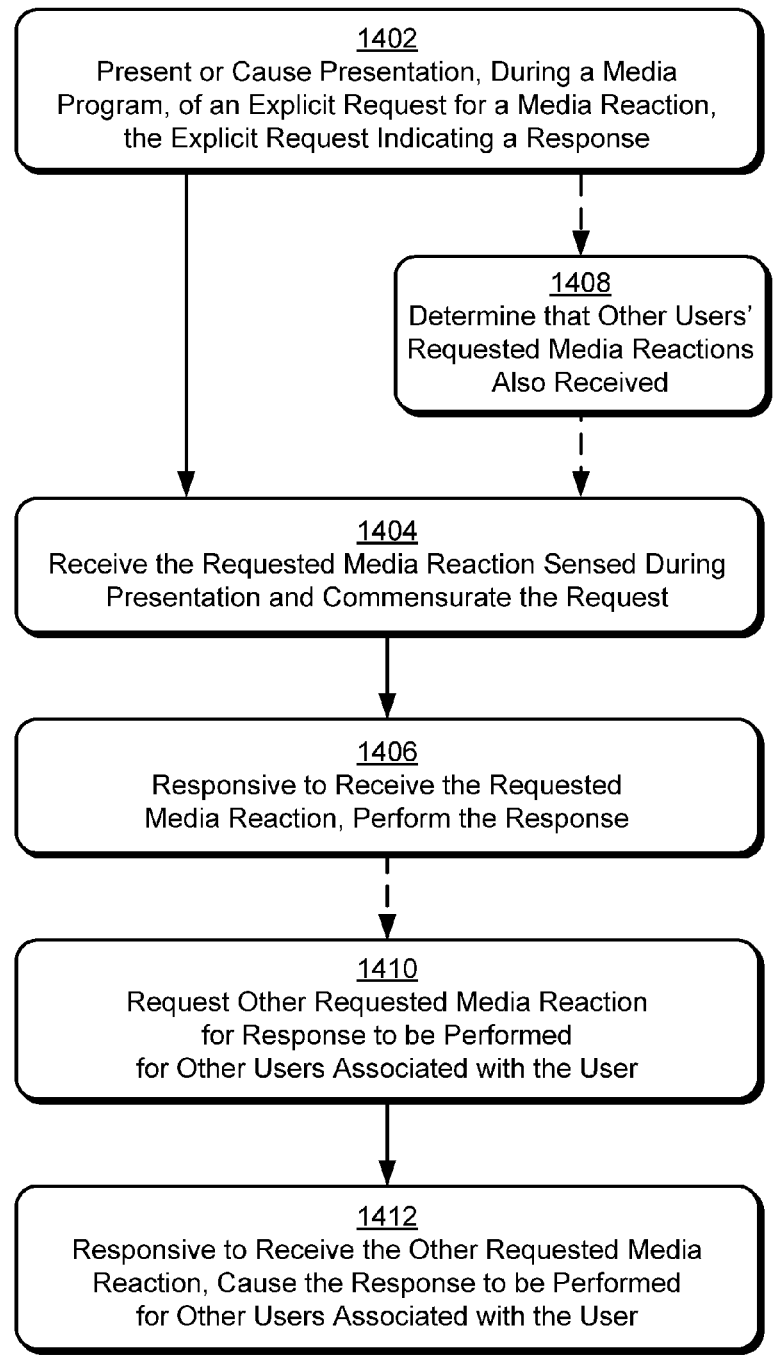
FIG. 14 illustrates methods for determining a future portion of a currently presented media program, including when the future portion is a response to an explicitly requested media reaction.

FIG. 14 depicts methods 1400 for determining a future portion of a currently presented media program, including when the future portion is a response to an explicitly requested media reaction.

Block 1402 presents or causes presentation of, during a media program, an explicit request for a requested media reaction, the explicit request being part of the media program and indicating a response to the requested media reaction, the requested media reaction being a physical change to a user. The media reaction can be one or more of those described, such as raising a hand, cheering, smiling, and so forth.

Further, an explicit request can be presented as part of and within the media program. Thus, an advertisement may have built into a portion of the advertisement text or narrator asking the user to raise his hand to arrange a test drive of an automobile; or a reality-show, whether live or recorded, may include the host asking the audience to cheer or boo for a character to decide which character remains on the show; or a suspense movie may have a character in the movie ask a user whether they should run, hide, or fight the bad guy.

Alternatively, the explicit request can be presented but not as part or within the media program, such as with a pop-up window superimposed over the media program.

The response itself can be similar to as noted above for advertisements, such as an offer for a coupon or information about a product or service and the like, whether in an advertisement or a non-advertisement media program.

The response may also or instead include presenting different portions of media later in the program. A reality show may explicitly request media reactions to present more about a character or situation, such as "Please wave one hand if you want to see more about Ginger's adventures helping the homeless, please wave both hands if you want to see more about Bart's trip to the bike shop, or please cheer if you want to see more about Susie's fight with Ginger about Bart." In this example, the response has three parts (or can be considered three responses), one response or sub-response for each media reaction, here Ginger's Adventure, Bart's Trip, or Susie's Fight.

Block 1404 receives the requested media reaction sensed during presentation and commensurate the explicit request, the requested media reaction determined based on sensor data passively sensed during the presentation and commensurate with the presentation of the explicit request. The techniques may receive the requested media reaction from another entity or determine the media reaction based on sensor data, passive or otherwise. In one embodiment, block 1404 is performed by state module 106. State module 106 determines, based on sensor data passively sensed during the media program, at or immediately after presenting the explicit request, and measuring the physical change to the user, the requested media reaction.

Block 1406, responsive to receiving the requested media reaction, performs the response. Optionally or additionally, methods 1400 may, prior to performing the potential response at block 1406, determine at block 1408 that other users' requested media reactions are also received and base the potential response on these other users' requested media reactions.

In such a case, portion module 224 may, prior to performing the response, determine that other requested media reactions of other users during other presentations of the media program are also received. Thus, portion module 224 may base the response on other users' media reactions, such as presenting Susie's Fight based on the user and other user's media reaction requesting this portion to be shown. The other users' media reaction may be for all users, users of a same demographic group, the user's friends (whether in the room watching with the user or not), or the user's family (e.g., those in the room also responding to the explicit request).

Also optionally or additionally, methods 1400 may proceed to block 1410. Block 1410 requests another requested media reaction for another response to be performed for other users associated with the user. This can be presented as a follow-up explicit request, such as a request that a user raise his or her hand to send a coupon also to the user's friends.

The request may involve both a user and his or her friends watching remotely. Thus, a user may select to watch Susie's Fight but, after making the media reaction, portion module 224 presents a second request asking if the user wants to instead watch what the user's friend Lydia previously or concurrently requested to watch, namely Ginger's Adventure, or what a majority of her friends requested to watch, such as five or the user's eight friends having selected to watch more about Bart's Trip.

Block 1412, responsive to receiving the second requested media reaction, causes the response to also be presented to the other users. Portion module 224 may do so directly when operating remotely or may communicate with a remote entity to cause that entity to have the response presented to the other users. Concluding the present example, assume that the user selects to watch what Lydia—her best friend—selected to watch, namely Ginger's Adventure so that she and Lydia can discuss it at school tomorrow. Note that the user also knows that most of her other friends picked to watch Bart's Trip, and thus she will know to ask them whether they liked it. The user may, if her friends said Bart's Trip was fantastic, re-watch the program and select to instead watch Bart's Trip.

Figure 15:
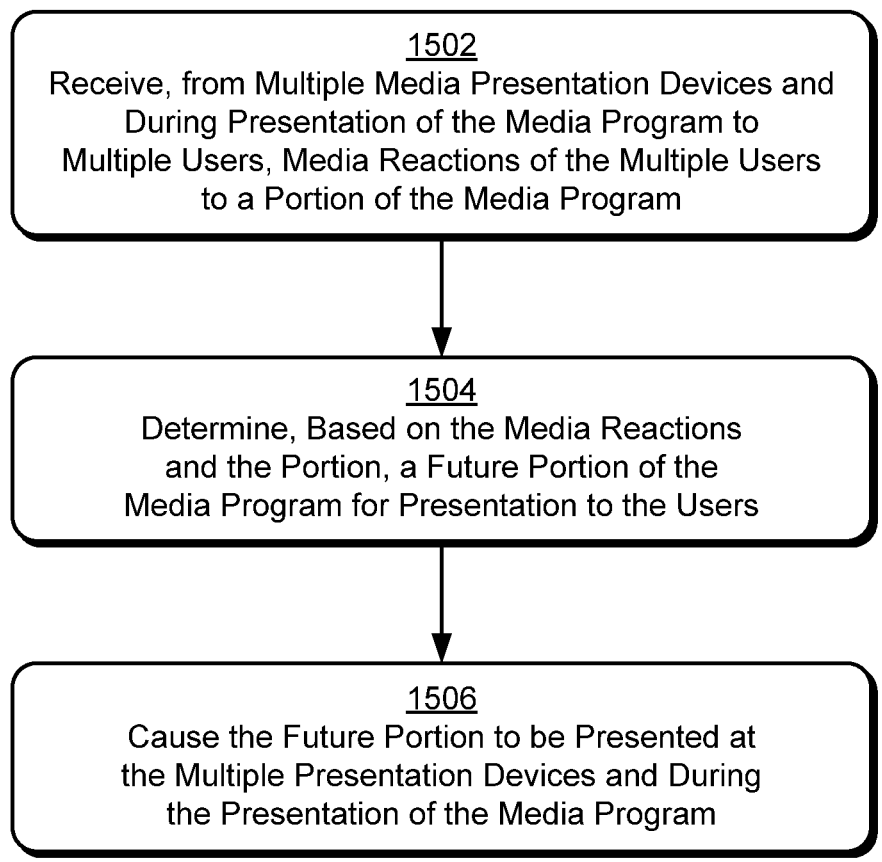
FIG. 15 illustrates methods for determining a future portion of a currently presented media program, including based on multiple users' media reactions.

FIG. 15 depicts methods 1500 for determining a future portion of a currently presented media program, including based on multiple users' media reactions.

Block 1502 receives, from multiple media presentation devices, at a remote entity, and during presentation of a media program to multiple users through the multiple media presentation devices, media reactions of the users, the media reactions based on sensor data passively sensed at the multiple media presentation devices and during a portion of the media program. The media program may be presented live, concurrently, or disjointed to the multiple users. As shown in FIG. 13, current media reaction 1306 may be received alone or with other information as noted above, such as demographics 1302, portion of reaction history 1304, and information about media program 1308, though in this case from multiple computing devices 202.

Block 1504 determines, based on the media reactions and the portion, a future portion of the media program for presentation to the users, the future portion of the media program occurring later in the media program than the portion. As shown in FIG. 13, this media program can be remotely stored, such as media program 210 of FIGS. 3 and 13, or local, such as shown in FIG. 2. Also as noted herein, other information may also be used in the determination.

The media program can be one of the many noted above, such as an advertisement. In such a case, portions module 224 and/or advertisement module 220 may determine the future portion based on it being more likely to be successful than one or more other previously prepared portions of a set of selectable portions (e.g., portions 214 of FIG. 13). Thus, a group of users showing a poor reaction to a first portion listing details about a realty company may be used to determine to present a third portion that is simpler or more stylish rather than continue detailing the realty company. Numerous other examples are set forth above.

Block 1506 causes the future portion of the media program to be presented to the users at the multiple media presentation devices and during the presentation of the media program. Block 1506 may do so in the various manners detailed above, such as in real time and streamed from remote device 302 to multiple users through multiple computing devices 202.

In some embodiments, media reactions of multiple users can be used to determine ways in which to create future programs or which previously-prepared future programs to present. Consider a case where a media provider has ten timeslots for an adventure television series. Assume that the first three programs may have some internal portions that can be altered based on the techniques but that for the next seven timeslots (e.g., weeks in a season) there are 11 episodes prepared. Television seasons are often structured such that a full season is prepared in advance, thereby making large in-season changes difficult to perform. A media provider may, at the time the season's episodes are prepared, be able to prepare additional whole programs. Thus, the media provider may determine, based on media reactions from multiple users over the first three episodes and to multiple portions of those episodes, that a particular character is very interesting to the audience. By so doing, episodes focusing on that character may be shown instead of others.

Also or additionally, some previously prepared episodes may have multiple sets of scenes that can be presented, and so the episode may be tailored to the audience (generally or to various groups) based on these media reactions. In this way media reactions can be used to determine future portions of a media program, even when the changes are not in real time.

The preceding discussion describes methods relating to determining a future portion of a currently presented media program, as well as other methods and techniques. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1-3, 10, 13, and 16 (device 1600 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., state module 106, interest module 108, interface module 110, history module 216, advertisement module 220, and portion module 224) represent program code that performs specified tasks when executed on a processor (e.g., processor(s) 204 and/or 306). The program code can be stored in one or more computer-readable memory devices, such as CRM 206 and/or remote CRM 308 or computer-readable storage media 1614 of FIG. 16.

Example Device

Figure 16:
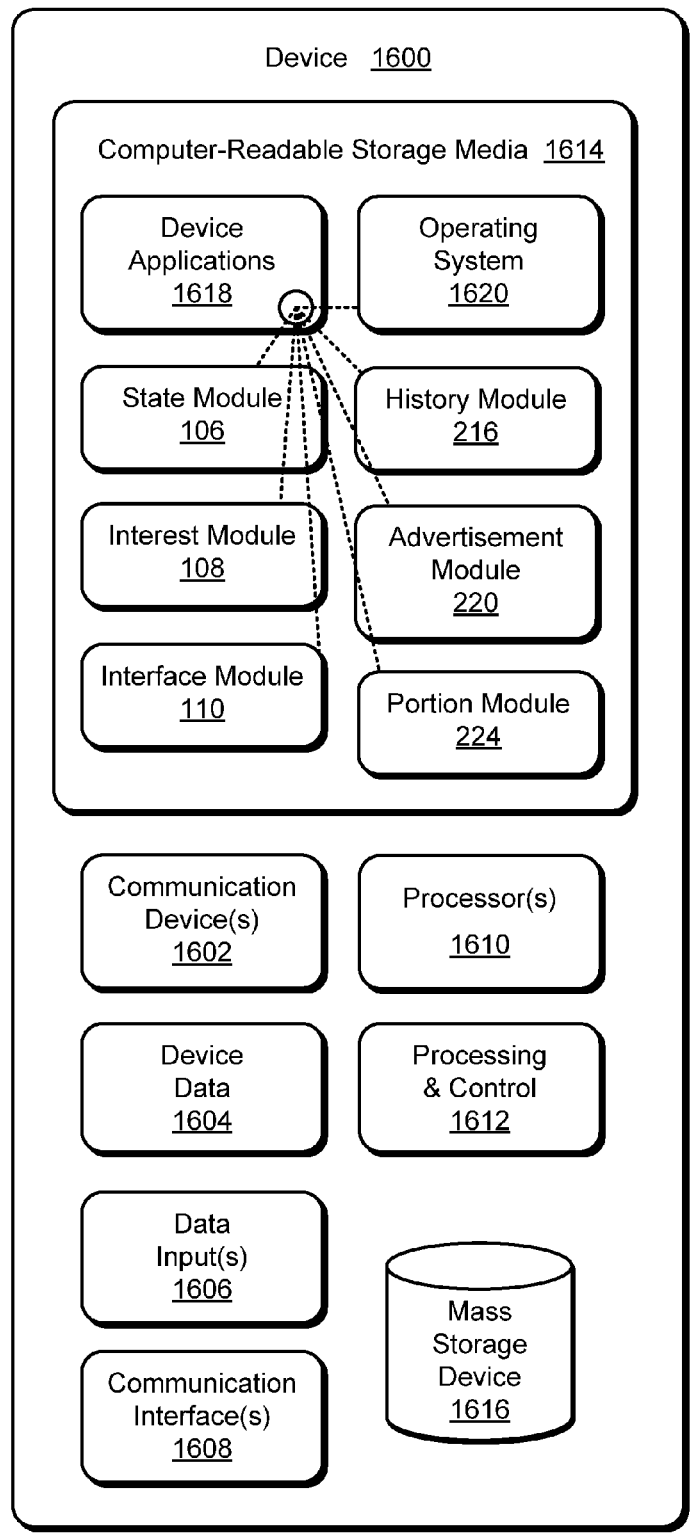
FIG. 16 illustrates an example device in which techniques for determining a future portion of a currently presented media program, as well as other techniques, can be implemented.

FIG. 16 illustrates various components of example device 1600 that can be implemented as any type of client, server, and/or computing device as described with reference to the previous FIGS. 1-15 to implement techniques for determining a future portion of a currently presented media program. In embodiments, device 1600 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 1600 may also be associated with a user (e.g., a person) and/or an entity that operates the device such that a device describes logical devices that include users, software, firmware, and/or a combination of devices.

Device 1600 includes communication devices 1602 that enable wired and/or wireless communication of device data 1604 (e.g., received data, data that is being received, data scheduled for broadcast, data packets of the data, etc.). Device data 1604 or other device content can include configuration settings of the device, media content stored on the device (e.g., media programs 210), and/or information associated with a user of the device. Media content stored on device 1600 can include any type of audio, video, and/or image data. Device 1600 includes one or more data inputs 1606 via which any type of data, media content, and/or inputs can be received, such as human utterances, user-selectable inputs, messages, music, television media content, media reactions, recorded video content, and any other type of audio, video, and/or image data received from any content and/or data source.

Device 1600 also includes communication interfaces 1608, which can be implemented as any one or more of a serial and/or parallel interface, a wireless interface, any type of network interface, a modem, and as any other type of communication interface. Communication interfaces 1608 provide a connection and/or communication links between device 1600 and a communication network by which other electronic, computing, and communication devices communicate data with device 1600.

Device 1600 includes one or more processors 1610 (e.g., any of microprocessors, controllers, and the like), which process various computer-executable instructions to control the operation of device 1600 and to enable techniques for determining a future portion of a currently presented media program and other methods described herein. Alternatively or in addition, device 1600 can be implemented with any one or combination of hardware, firmware, or fixed logic circuitry that is implemented in connection with processing and control circuits which are generally identified at 1612. Although not shown, device 1600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1600 also includes computer-readable storage media 1614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1600 can also include a mass storage device 1616.

Computer-readable storage media 1614 provides data storage mechanisms to store device data 1604, as well as various device applications 1618 and any other types of information and/or data related to operational aspects of device 1600. For example, an operating system 1620 can be maintained as a computer application with computer-readable storage media 1614 and executed on processors 1610. Device applications 1618 may include a device manager, such as any form of a control application, software application, signal-processing and control module, code that is native to a particular device, a hardware abstraction layer for a particular device, and so on.

Device applications 1618 also include any system components, engines, or modules to implement techniques for determining a future portion of a currently presented media program. In this example, device applications 1618 can include state module 106, interest module 108, interface module 110, history module 216, advertisement module 220, and/or portion module 224.

CONCLUSION

Although embodiments of techniques and apparatuses for determining a future portion of a currently presented media program have been described in language specific to features and/or methods, it is to be understood that the subject of the appended claims is not necessarily limited to the specific features or methods described. Rather, the specific features and methods are disclosed as example implementations for determining a future portion of a currently presented media program.

What is claimed is:

1. A method implemented by a computing device comprising:
  receiving, by the computing device and during a presentation of a first portion of a currently presented media program, passively sensed sensor data for a user during the first portion of the currently presented media program;
  determining, by the computing device, a probability of a state of the user and an engagement level of the user during the first portion of the currently presented media program based on the sensor data, the probability of the state of the user and the engagement level of the user during the first portion of the currently presented media program being normalized by historical sensor data for the user such that the determination of the probability of the state of the user and determination of the engagement level of the user are specific to the user;
  determining, by the computing device, an interest level of the user during the first portion of the currently presented media program based on the probability of the state of the user during the first portion of the currently presented media program, the engagement level of the user during the first portion of the currently presented media program, and a context for the first portion of the currently presented media program, the interest level of the user being normalized by the historical sensor data for the user such that the determination of the interest level of the user is specific to the user;
  determining, by the computing device, based on the first portion of the currently presented media program and the interest level determined to be high for the user during the first portion of the currently presented media program, a future portion of the currently presented media program, the future portion of the currently presented media program:
    occurring during a later portion of the currently presented media program;
    during a current presentation of the currently presented media program; and
    selected from a set of future portions of the currently presented media program based on a similarity to the first portion of the currently presented media program; and
  causing, by the computing device, the future portion of the currently presented media program to be presented during the later portion of the currently presented media program and during the current presentation of the currently presented media program.

2. A method as described in claim 1, wherein the currently presented media program includes a previously-scheduled future portion of the currently presented media program and causing the future portion of the currently presented media program is effective to replace the previously-scheduled future portion of the currently presented media program with the future portion of the currently presented media program.

3. A method as described in claim 1, wherein receiving the sensor data is from a media presentation device on which the currently presented media program is presented and causing the future portion of the currently presented media program to be presented is performed by the computing device through a communications network.

4. A method as described in claim 1, further comprising receiving other sensor data, the other sensor data sensed during the first portion of the currently presented media program and associated with a different user than the user associated with the first-mentioned sensor data, the different user physically local to the user, and wherein determining the future portion of the currently presented media program is further based on the other sensor data.

5. A method as described in claim 1, wherein the sensor data is received from an entity local to a media presentation device on which the currently presented media program is presented and the set of future portions of the currently presented media program is previously stored local to the media presentation device and associated with a time-range in the currently presented media program at which to present the future portion of the currently presented media program.

6. A method as described in claim 1, wherein the first portion of the currently presented media program is an advertisement and determining the future portion of the currently presented media program determines the future portion of the currently presented media program based on the future portion of the currently presented media program determined to have the user have a higher interest level than one or more other previously prepared future portion of the currently presented media programs of the set of future portions of the currently presented media program.

7. A method as described in claim 1, wherein the determining the future portion of the currently presented media program is further based on sensor data actively sensed during the first portion of the currently presented media program.

8. A method as described in claim 1, wherein the method further comprises determining, by the computing device, based on the first portion of the currently presented media program and the interest level being determined to be low for the user during the first portion of the currently presented media program, another future portion of the currently presented media program, the other future portion of the currently presented media program:
    occurring during a later portion of the currently presented media program;
    during a current presentation of the currently presented media program; and
    selected from the set of future portions of the currently presented media program based on a dissimilarity to the first portion of the currently presented media program.

9. A method as described in claim 1, wherein the interest level for the user is further based on one or more of a demographic of the user, weather information at the user's location, the user's schedule, a time of day, or sensor data received from other users remote to the user.

10. An apparatus comprising:
    one or more computer processors; and
    one or more computer-readable storage media having instructions stored thereon that, responsive to execution by the one or more computer processors, perform operations comprising:
        receiving, during a presentation of a first portion of a currently presented media program, passively sensed sensor data for a user during the first portion of the currently presented media program for a user;
        determining a probability of a state of the user and an engagement level of the user during the first portion of the currently presented media program based on the sensor data, the probability of the state of the user and the engagement level of the user during the first portion of the currently presented media program being normalized by historical sensor data received for the user;
        determining an interest level of the user during the first portion of the currently presented media program based on the probability of the state of the user during the first portion of the currently presented media program, the engagement level of the user during the first portion of the currently presented media program, and a context for the first portion of the currently presented media program, the interest level of the user being normalized by the historical sensor data received for the user;
        determining, based on the first portion of the currently presented media program and the interest level determined to be high for the user during the first portion of the currently presented media program, a future portion of the currently presented media program, the future portion of the currently presented media program:
            to occur during a later portion of the currently presented media program;
            during a current presentation of the currently presented media program; and
            selected from a set of future portions of the currently presented media program based on a similarity to the first portion of the currently presented media program; and
        causing the future portion of the currently presented media program to be presented during the later portion of the currently presented media program and during the current presentation of the currently presented media program.

11. An apparatus as described in claim 10, wherein the currently presented media program includes a previously-scheduled future portion of the currently presented media program and causing the future portion of the currently presented media program is effective to replace the previously-scheduled future portion of the currently presented media program with the future portion of the currently presented media program.

12. An apparatus as described in claim 10, wherein receiving the sensor data is from a media presentation device on which the currently presented media program is presented and that is remote from the apparatus.

13. An apparatus as described in claim 10, wherein the operations further comprise receiving other sensor data, the other sensor data sensed during the first portion of the currently presented media program and associated with a different user than a user associated with the first-mentioned sensor data, the different user physically local to the user, and wherein determining the future portion of the currently presented media program is further based on the other sensor data.

14. An apparatus as described in claim 10, wherein the operations further comprise presenting, by the apparatus, the currently presented media program and receiving, from the user and by the apparatus, the sensor data, and wherein determining the future portion of the currently presented media program determines the future portion of the currently presented media program from the set of future portions of the currently presented media program previously stored on the one or more computer-readable storage media, the set of future portions of the currently presented media program associated with a time-range in the currently presented media program at which to present the future portion of the currently presented media program.

15. An apparatus as described in claim 10, wherein the first portion of the currently presented media program is an advertisement and determining the future portion of the currently presented media program determines the future portion of the currently presented media program based on the future portion of the currently presented media program determined to have the user have a higher interest level than one or more other previously prepared future portions of the currently presented media program of the set of future portions of the media currently presented program.

16. An apparatus as described in claim 10, wherein the determining the future portion of the currently presented media program is further based on sensor data actively sensed during the first portion of the currently presented media program.

17. An apparatus as described in claim 10, wherein the interest level for the user is further based on one or more of a demographic of the user, weather information at the user's location, the user's schedule, a time of day, or sensor data received from other users remote to the user.

18. A method implemented by a computing device comprising:
   receiving, by the computing device and during a presentation of a first portion of a currently presented media program, passively sensed sensor data for a user during the first portion of the currently presented media program for a user;
   determining, by the computing device, a probability of a state of the user and an engagement level of the user during the first portion of the currently presented media program based on the sensor data, the probability of the state of the user and the engagement level of the user during the first portion of the currently presented media program being normalized by historical sensor data received for the user;
   determining, by the computing device, an interest level of the user during the first portion of the currently presented media program based on the probability of the state of the user during the first portion of the currently presented media program, the engagement level of the user during the first portion of the currently presented media program, and a context for the first portion of the currently presented media program, the interest level of the user being normalized by the historical sensor data received for the user;
   determining, by the computing device, based on the first portion of the currently presented media program and the interest level being determined to be low for the user during the first portion of the currently presented media program, a future portion of the currently presented media program, the future portion of the currently presented media program:
      occurring during a later portion of the currently presented media program;
      during a current presentation of the currently presented media program; and
      selected from a set of future portions of the currently presented media program based on a dissimilarity to the first portion of the currently presented media program; and
   causing, by the computing device, the future portion of the currently presented media program to be presented during the later portion of the currently presented media program and during the current presentation of the currently presented media program.

19. A method as described in claim 18, wherein the method further comprises determining, by the computing device, based on the first portion of the currently presented media program and the interest level being determined to be high for the user during the first portion of the currently presented media program, another future portion of the currently presented media program, the other future portion of the currently presented media program:
   occurring during a later portion of the currently presented media program;
   during a current presentation of the currently presented media program; and
   selected from the set of future portions of the currently presented media program based on a similarity to the first portion of the currently presented media program.

20. A method as described in claim 18, wherein the interest level for the user is further based on one or more of a demographic of the user, weather information at the user's location, the user's schedule, a time of day, or sensor data received from other users remote to the user.

* * * * *